(12) United States Patent
Adamczyk et al.

(10) Patent No.: US 9,288,276 B2
(45) Date of Patent: Mar. 15, 2016

(54) APPLICATION SERVICES INFRASTRUCTURE FOR NEXT GENERATION NETWORKS INCLUDING A NOTIFICATION CAPABILITY AND RELATED METHODS AND COMPUTER PROGRAM PRODUCTS

(75) Inventors: Maria Adamczyk, Alpharetta, GA (US); Michael Denny, Sharpsburg, GA (US); Nicholas Steven Huslak, Duluth, GA (US); Myranda Johnson, Smyrna, GA (US); Abdi Modarressi, Lawrenceville, GA (US); Hong Nguyen, Atlanta, GA (US); Gregory Patterson, Atlanta, GA (US); Scott Traynham Stillman, Peachtree City, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1369 days.

(21) Appl. No.: 11/931,949

(22) Filed: Oct. 31, 2007

(65) Prior Publication Data
US 2008/0162637 A1   Jul. 3, 2008

Related U.S. Application Data

(60) Provisional application No. 60/856,617, filed on Nov. 3, 2006.

(51) Int. Cl.
*H04L 29/08* (2006.01)
*H04L 12/58* (2006.01)
*H04L 12/18* (2006.01)
*H04L 29/06* (2006.01)

(52) U.S. Cl.
CPC .......... *H04L 67/24* (2013.01); *H04L 12/5815* (2013.01); *H04L 51/043* (2013.01); *H04L 12/1859* (2013.01); *H04L 63/10* (2013.01); *H04L 65/1016* (2013.01); *H04L 67/16* (2013.01); *H04L 67/306* (2013.01)

(58) Field of Classification Search
USPC .................................................. 709/204–207
See application file for complete search history.

(56) References Cited

U.S. PATENT DOCUMENTS

| | | | | |
|---|---|---|---|---|
| 5,717,747 | A * | 2/1998 | Boyle et al. | 379/201.03 |
| 6,192,250 | B1 * | 2/2001 | Buskens et al. | 455/463 |
| 2004/0205212 | A1 * | 10/2004 | Huotari et al. | 709/230 |
| 2006/0148477 | A1 * | 7/2006 | Reilly | 455/436 |
| 2006/0253538 | A1 * | 11/2006 | Jung et al. | 709/206 |

* cited by examiner

*Primary Examiner* — Thai Nguyen
(74) *Attorney, Agent, or Firm* — Myers Bigel Sibley & Sajovec, PA

(57) ABSTRACT

A system for supporting a notification capability for a plurality of applications utilizing a next generation network having a network layer includes an application services middleware between the applications and the network layer comprising a plurality of common infrastructure elements usable by the applications. The common infrastructure elements provide both services associated with use of the network and services that are not associated with use of the network. The plurality of common infrastructure elements includes a notification service that is configured to facilitate the sending of messages from authorized services to recipients.

13 Claims, 20 Drawing Sheets

Interfaces Ph, Pi, Pc, Pg, Pk and Pl are based on existing R5 procedures e.g. CAMEL, MAP, CAP, RADIUS, ISC, Cx, Sh. The Pr, Pp interfaces are based on R6 procedures of the 3GPP-WLAN interworking architecture Single IP network View

APPLICATION SERVICES INFRASTRUCTURE FOR NEXT GENERATION NETWORKS INCLUDING A NOTIFICATION CAPABILITY AND RELATED METHODS AND COMPUTER PROGRAM PRODUCTS

RELATED APPLICATION

This application claims the benefit of and priority to U.S. Provisional Patent Application No. 60/856,617, filed Nov. 3, 2006, the disclosure of which is hereby incorporated herein by reference as if set forth in its entirety.

FIELD OF THE INVENTION

The present invention relates generally to communication networks, and, more particularly, to next generation networks.

BACKGROUND OF THE INVENTION

Next generation network (NGN) denotes the fully converged network of the future that provides advanced services of many kinds with many modalities (voice, video, data, signaling/control, management, connectivity, etc.). At the connectivity level, NGN may resemble the Internet with one difference: It may be like the Internet in its ubiquity, in the use of different continuously evolving access and backbone technologies, and in its universal use of the Internet Protocol (currently IPv4 evolving to IPv6) at the network layer. NGN connectivity, however, may be fundamentally different from the current Internet in that it may be quality-of-service (QoS) enabled, and may ultimately support QoS on demand. Quality of service is used in its broadest sense to include bandwidth, delay, delay variation (jitter) and other relevant metrics. Connectivity in NGN may be realized through multiple interconnected infrastructures, both access and backbone, operated within distinct administrative domains by different facility-based network service providers (NSPs).

Using the connectivity infrastructure of NGN may be an ever expanding set of sophisticated "applications." Rudimentary forms of some of these applications are currently provided by the Internet. These early services range from communication applications (e.g., email, IM, VoIP) to entertainment services that involve content delivery (e.g., music on demand, low quality video on demand, gaming) to a vast array of data and information services (e.g., browsing, searching, E-commerce, information retrieval, software distribution). Because the current Internet is not QoS-enabled, these services are typically provided on a best-effort basis, often with inconsistent or unpredictable quality and end-user experience. Furthermore, most applications today are "atomic" in nature, each offered independently on its own, typically with its own interface and other ancillary features like authentication and/or authorization. NGN may begin to change this paradigm first by enabling the applications to use the on-demand QoS capabilities of the underlying connectivity network to provide a much richer and more consistent user experience. More significantly, however, applications may progressively lose their atomic nature and may become increasingly more intertwined and composite, and hence more useful to the end user. Thus one may be able to invoke feature-rich multi-modal communication capabilities with information sharing, multimedia conferencing with elaborate collaboration features, multi-player gaming with advanced real-time communication enhancements, E-commerce combined with information and communication features that relate to product marketing and support, and education and training services that will virtually erase distance barriers by providing near-presence experience. NGN applications may also incorporate more unified and holistic interface and support capabilities like single sign-on, management of user profile, presence, availability, and seamless mobility in ways that may not have been possible in the past.

The current paradigm of IP application development basically treats the Internet (and subtending intranets) as a ubiquitous connectivity infrastructure and designs and implements each application at its edge in an autonomous manner, complete with all the supporting capabilities that the application needs. In this paradigm, the degree of convergence has advanced to encompass ubiquitous IP connectivity, in contrast to the older paradigm in which different types of applications would use their own connectivity infrastructure (voice telephony on wired and wireless circuit switched networks, video on DBS and HFC infrastructures, email/IM and information services on the Internet, signaling and control on SS7, etc.). A large set of today's applications are developed and offered by entities that do not own a connectivity infrastructure (e.g., Microsoft, AOL) and just use the public Internet as a common best-effort connectionless delivery mechanism. This architecture is depicted, for example, in FIG. 1 where the application layer is decomposed into a collection of more or less independent application stacks. The collection of shapes in each application stack represents a set of supporting capabilities needed by the application for its proper functioning. As graphically depicted in FIG. 1, many of these supporting capabilities are common across different applications.

Just as the IP connectivity network may undergo fundamental changes to support QoS on demand, so may the application layer architecture to enable rapid, cost effective rollout of sophisticated next generation application services.

SUMMARY

According to some embodiments of the present invention, a system for supporting a notification capability for a plurality of applications utilizing a next generation network having a network layer includes an application services middleware between the applications and the network layer comprising a plurality of common infrastructure elements usable by the applications. The common infrastructure elements provide both services associated with use of the network and services that are not associated with use of the network. The plurality of common infrastructure elements includes a notification service that is configured to facilitate the sending of messages from authorized services to recipients.

In other embodiments, the notification service is an Internet Protocol (IP) Multimedia Subsystem (IMS) network element.

In still other embodiments, the notification service includes a notification server that is configured to receive the messages from the authorized services for delivery to the recipients and to send the messages to the recipients, an IMS Serving Call Session Control Function (S-CSCF) that is configured to maintain session state information between the notification server and the authorized services and between the notification server and the recipients, and a Home Subscriber Server (HSS) that is configured to store recipient profile and preference data.

In still other embodiments, the notification server is configured to send the notification messages to the recipients on demand, at a specific future time, and/or on a periodic schedule.

In still other embodiments, the notification server is configured to retrieve profile and preference data from the HSS for the recipients. The notification server is configured to apply rules to the profile and preference data to determine how to send the messages to the recipients and/or to determine when to send the messages to the recipients.

In still other embodiments, the plurality of common infrastructure elements further includes a mobility management service, a presence service, and/or a location service. The notification server is further configured to send a message to at least one of the recipients based on a location of the at least one of recipients and/or based on an identity of the authorized service that is the source of the message to the at least one of the recipients.

In still other embodiments, the plurality of common infrastructure elements further includes an authentication service that is configured to ensure that communication between the notification server and the authorized services and between the notification server and the recipients is secure.

In still other embodiments, the notification server is further configured to send a confirmation to at least one of the authorized services when one of the messages for which the at least one of the authorized services is the source is delivered.

In still other embodiments, the IMS includes a Multimedia Resource Function (MRF) that is configured to perform content adaptation for at least one of the messages.

In still other embodiments, the authorized services include at least one of the plurality of applications and/or a subscriber device registered with the IMS.

In still other embodiments, the notification service is a 3GPP network push service element.

In still other embodiments, a computer program product includes a computer readable medium having computer readable program code embodied therein. The computer readable program code includes computer readable program code configured to provide an application services middleware as recited above.

In further embodiments of the present invention, a notification service is provide by providing an application services middleware between a plurality of applications and a network layer of a next generation network. The application services middleware includes a plurality of common infrastructure elements usable by the different applications. The common infrastructure elements provide both services associated with use of the network and services that are not associated with use of the network. A notification service is incorporated into the application services middleware as a common infrastructure element. The notification service is configured to facilitate the sending of messages from authorized services to recipients.

In still further embodiments, the notification service is an Internet Protocol (IP) Multimedia Subsystem (IMS) network element.

In still further embodiments, the method further includes receiving at the notification service a message from one of the authorized services for delivery to one of the recipients, retrieving profile and preference data from a Home Subscriber Server (HSS) for the one of the recipients, applying rules to the profile and preference data at the notification service to determine how to send the message from one of the authorized services to the one of the recipients and/or to determine when to send the message from one of the authorized services to the one of the recipients, and sending the message from one of the authorized services to the one of the recipients.

In still further embodiments, applying the rules includes applying rules to the profile and preference data at the notification service to determine whether to send the message from one of the authorized services to one of the recipients on demand, at a specific future time, and/or on a periodic schedule.

In still further embodiments, sending the message includes sending the message from one of the authorized services to the one of the recipients based on a location of the one of the recipients and/or based on an identity of the one of the authorized services.

In still further embodiments, the method further includes sending a confirmation to the one of the authorized services when the message to the one of the recipients is delivered.

In still further embodiments, the authorized services include at least one of the plurality of applications and/or a subscriber device registered with the IMS.

In still further embodiments, a computer program product includes a computer readable medium having computer readable program code embodied therein. The computer readable program code includes computer readable program code configured to carry out the method(s) as recited above.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
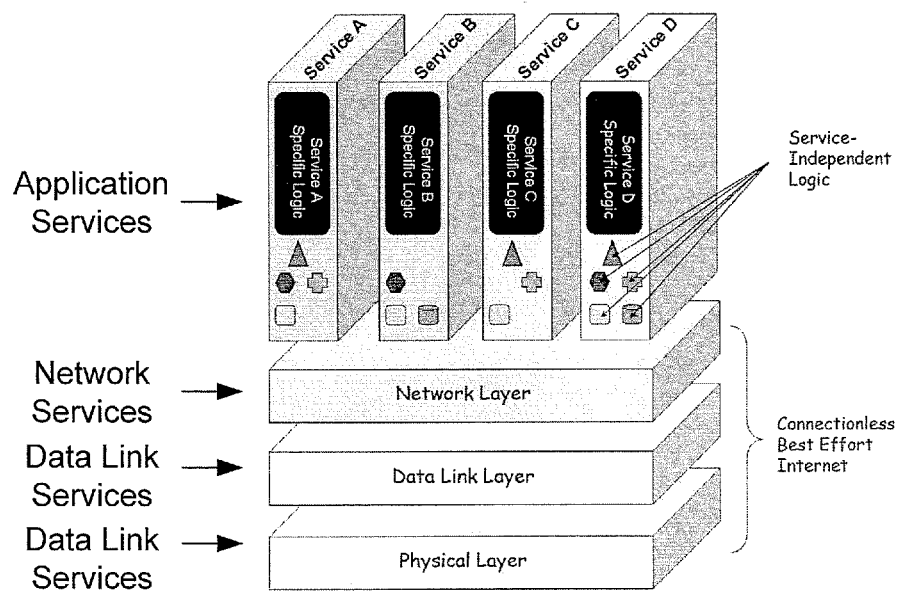
FIG. 1 is a diagram of conventional application development using a "silo" approach in which each application uses its own version of logic elements that are service-independent.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The following acronyms may be used herein and are defined as follows:

| | |
|---|---|
| 3GPP | Third Generation Partnership Project |
| A/V | Audio Visual |
| AAA | Authentication, Authorization, and Accounting |
| AC | Authentication Center |

| | | |
|---|---|---|
| AGPS | Assisted Global Positioning System | |
| AIN | Advanced Intelligent Network | |
| ANSI | American National Standards Institute | |
| AOA | Angle of Arrival | |
| AOL | America Online | |
| API | Application Program Interface | |
| AS | Application Server | |
| ASI | Application Services Infrastructure | |
| ASP | Application Service Provider | |
| ATM | Asynchronous Transfer Mode | |
| AUC | Authentication Center | |
| BBUA | Back to Back User Agent | |
| BGCF | Breakout Gateway Control Function | |
| BRAS | Broadband Remote Access Server | |
| BSC | Base Station Controller | |
| BTS | Base Transceiver Station | |
| BW | Bandwidth | |
| CAMEL | Custom Applications for Mobile Network Enhanced Logic | |
| CDR | Call Detail Record | |
| CN | Core Network | |
| CPE | Customer Premises Equipment | |
| CPN | Customer Premises Network | |
| CRM | Customer Relationship Management | |
| CS | Circuit Switched | |
| CSCF | Call Session Control Function | |
| DBS | Direct Broadcast Service | |
| DiffServ | Differentiated Services | |
| DMH | Dual Mode Handset | |
| DNS | Domain Name Service | |
| DPE | Distributed Processing Environment | |
| DSL | Digital Subscriber Loop | |
| DSLAM | Digital Subscriber Line Access Multiplex | |
| EDGE | Enhanced Data Rates for Global Evolution | |
| EF | Expedited Services | |
| E-OTD | Enhanced Observation Time Difference | |
| ETSI | European Telecommunications Standards Institute | |
| FCC | Federal Communications Commission | |
| FIM | Feature Interaction Management | |
| GERAN | GSM/EDGE Radio Access Network | |
| GMLC | Gateway Mobile Location Center | |
| GPRS | General Packet Radio Service | |
| GPS | Global Positioning System | |
| GSM | Global Systems for Mobile Telecommunications | |
| GTP | GPRS Tunneling Protocol | |
| GUP | Generic User Profile | |
| GW | Gateway | |
| HFC | Hybrid Fiber Coax | |
| HLR | Home Location Register | |
| HSS | Home Subscriber Server | |
| I-CSCF | Interrogating CSCF | |
| IEEE | Institute for Electrical and Electronics Engineers | |
| IETF | Internet Engineering Task Force | |
| IFC | Initial Filter Criteria | |
| IM | Instant Messaging | |
| IMM | IMS Mobility Manager | |
| IMPS | Instant Messaging and Presence Using SIP | |
| IMS | IP Multimedia Subsystem | |
| IMSI | International Mobile System Identifier | |
| IM-SSF | IP Multimedia SSF | |
| IN | Intelligent Network | |
| IP | Internet Protocol | |
| IP-CAN | IP Connectivity Access Network | |
| IPv4 | Internet Protocol Version 4 | |
| ISC | IMS Service Control | |
| ISP | Internet Service Provider | |
| IT | Information Technology | |
| JAIN | JAVA APIs for Integrated Networks | |
| LB | Location Based | |
| LBS | LB Service | |
| LCS | Location Service | |
| LD | Long Distance | |
| LIF | Location Interoperability Forum | |
| LMU | LCS Measurement Unit | |
| LNP | Local Number Portability | |
| MAP | Mobile Application Part | |
| Mb | Megabyte | |
| MBMS | Multimedia Broadcast/Multicast Service | |
| MGCF | Media Gateway Control Function | |
| MGW | Media Gateway | |
| MLP | Mobile Location Protocol | |
| MPC | Mobile Positioning Center | |
| MPLS | Multiprotocol Label Switching | |
| MRF | Media Resource Function | |
| MRFC | MRF Controller | |
| MRFP | MRF Processor | |
| MSC | Mobile Switching Center | |
| MSISDN | Mobile Station Integrated Services Digital Network | |
| NGN | Next Generation Network | |
| NSP | Network Service Provider | |
| OAM&P | Operations, Administration, Management, and Provisioning | |
| OMA | Open Mobile Alliance | |
| OSA | Open Services Architecture | |
| PAM | Presence and Availability Management | |
| PC | Personal Computer | |
| P-CSCF | Proxy CSCF | |
| PDA | Personal Digital Assistant | |
| PDSN | Packet Data Serving Node | |
| PEC | Presence Enabled Contacts | |
| PIN | Personal Identification Number | |
| PLMN | Public Land Mobile Network | |
| POTS | Plain Old Telephone Service | |
| PS | Packet Switched | |
| PSTN | Public Switched Telephone Network | |
| PTT | Push To Talk | |
| PVC | Permanent Virtual Circuit | |
| PVR | Personal Video Recorder | |
| QoS | Quality of Service | |
| RAF | Repository Access Function | |
| RAN | Radio Access Network | |
| RG | Routing Gateway | |
| SBC | Formerly Southwestern Bell | |
| SCF | Service Capability Feature | |
| SCIM | Service Capability Interaction Management | |
| SCP | Service Control Point | |
| SCS | Service Capability Server | |
| S-CSCF | Serving CSCF | |
| SDR | Session Detail record | |
| SGSN | Serving GPRS Support Node | |
| SIMPLE | SIP for Instant Messaging and Presence Leveraging Extensions | |
| SIP | Session Initiation Protocol | |
| SLA | Service Level Agreement | |
| SM | Session Management | |
| SMLC | Serving Mobile Location Center | |
| SMS | Short Message Service | |
| SOAP | Simple Object Access Protocol | |
| SPAN | Services and Protocol for Advanced Networks | |
| SS | Softswitch | |
| SSP | Service Switching Point | |
| TDOA | Time Difference of Arrival | |
| TIPHON | Telecommunications and Internet Protocol Harmonization over Networks | |

| | |
|---|---|
| TISPAN | Combination of TIPHON and SPAN |
| TR | Technical Reference |
| TS | Technical Specification |
| U.S. | United States |
| UDDI | Universal Description, Discovery, and Integration |
| UE | User Equipment |
| UI | User Interface |
| UML | Unified Modeling Language |
| UMTS | Universal Mobile Telephone Service |
| URI | Uniform Resource Identifier |
| URL | Uniform Resource Locator |
| US | United States |
| UTRAN | Universal Terrestrial Radio Access Network |
| VLR | Visitor Location Register |
| VoIP | Voice over IP |
| VPN | Virtual Private Network |
| WAP | Wireless Access Protocol |
| WiFi | Wireless Fidelity |
| WLAN | Wireless LAN |
| WV | Wireless Village |
| XML | Extensible Markup Language |

Next Generation Services

A service is defined as a set of well-defined capabilities offered to customers (who can be end-users or other service providers that may enhance the service and offer it to their end-users) and for which customers can potentially be billed. From a service provider's perspective, a service can emanate from any layer of the architecture (see FIG. 1). For example, physical layer services could include leasing of physical media like fiber to customers by facility-based providers. Data link services can provide layer-2 switched connectivity, e.g., an ATM Permanent Virtual Circuit (PVC) or Ethernet between customer locations. Network services emanate from the network layer and provide routed connectivity to customers, e.g., a network-based Virtual Private Network (VPN) service. Application services are offered to customers from the application layer, for example VoIP, video-on-demand, etc. Any service above the physical layer would transparently use the services of lower layers (either from the same provider or a different provider) in ways that are typically not visible to the upper layers. For the sake of brevity, and when the context is clear, application services may sometimes be referred to simply as services (or applications) with the understanding that they are indeed services provided at the application layer using an underlying QoS-enabled connectivity network.

The fundamental assumption is made that the overall NGN architecture design has to be ultimately driven by application services. It is very hard, if not impossible, to predict with any degree of certainty the specific application services that will flourish in next generation networks. Nonetheless, from a customer's viewpoint, the majority of next generation application services can probably be cast into one of the following broad categories:

Communication/Collaboration Services: These can be viewed as evolution of today's wired or wireless voice telephony on the real-time side, and voicemail/email on the non-real-time side. As voice increasingly becomes another data application with VoIP, it may be seen from existing trends that it will be enhanced initially with useful data features, and eventually with capabilities that will transform it into full-fledged voice-data-video communication. Similarly, voicemail, email and IM may become more unified and assume a multimedia character. The variations and composition of these with other applications may over time give rise to sophisticated multimedia multi-party application services with powerful collaboration features. Furthermore, seamless mobility may be interwoven into communication services in unprecedented ways. Customers may be able to seamlessly roam through macro (licensed spectrum) and micro (unlicensed spectrum) wireless networks, as well as interface with wireline infrastructures (DSL, Cable), while they maintain continuity of their in-progress service sessions.

Entertainment/Education Services: This set of application services deal with delivering rich-media content to the customer. Video-on-demand, music-on-demand, multi-player gaming and similar services are all examples in this category, which can be offered either on-demand as streaming applications with sophisticated end-user control or, alternatively, in conjunction with a PVR capability on a time-shifted basis. It is stipulated that time-shifted viewing may constitute a large portion of video services in the future.

Data/Information Services: This category represents a "catch all" class and may represent evolution of today's Internet usage pattern. Application services that fall into this category may include browsing, searching, information retrieval, software distribution, productivity applications, e-commerce, location, notification and "push"-type services, as well as new and innovative applications.

Ancillary/Management/Support Services: A special class of data services may be important when it comes to support of other application services. A large number of next generation end-user-facing applications may not be viable without a set of authentication, billing, security, screening, profile, presence, performance monitoring and similar capabilities to support them and make them easy and convenient to use. These services may have a middle-layer, management, or support flavor and may or may not generate revenues on their own, but they may be useful for a successful rollout of next generation application services, and may provide competitive differentiation.

Next generation networks not only may provide a ubiquitous connectivity infrastructure to address the needs of application services, but also may furnish a unified application service infrastructure that may provide middle layer capabilities to facilitate rapid, cost effective rollout of sophisticated next generation services, particularly when such applications need to interact with one another in complex scenarios. From an architecture design viewpoint (in contrast to the customer's viewpoint), next generation application services can be classified in a different way, bringing out in particular some of their connectivity and QoS requirements:

Conversational Services: These are applications that have low delay and jitter tolerance; their error tolerance can be moderate as in voice, or low as in video. Data rates to support these applications are generally symmetrical and can range from low to high. Real time communication services fall into this category.

Interactive Services: These services typically have a request/response transactional flavor exhibiting low tolerance for error and moderate tolerance for delay and jitter. Their bandwidth needs can range from low to high with generally non-symmetrical data rates. Most data/information services and some non-real-time communication services fall into this category.

Streaming Services: These applications have a low tolerance for error and high tolerance for delay and jitter (compensated for by play-out buffers). Their bandwidth needs can range from low to high and their data rates are typically non-symmetrical. Most content delivery and content on-demand services fall into this category.

Background Services: These applications have very little delay or jitter constraints, but require very low error rates. Bulk data transfer, SMS, and a lot of ancillary and management services fall into this class.

The broad categories of next generation application services have been examined from both from customers' perspectives and from the perspective of service providers. Some fundamental characteristics and mega-trends with respect to next generation networks and the services they provide that may set them apart from the current communication infrastructures will now be discussed.

NGN Service Characteristics

There are a number of characteristics that may collectively set NGN architecture and services apart from PSTN and other legacy infrastructures. These characteristics bear on the nature of customer-facing applications and devices, network architectures, and evolving needs and demands of an increasingly savvy and mobile user community:

A major architectural breakthrough in NGN, brought about by softswitching, has resulted in a relatively clean separation of call/service processing from the underlying connectivity network. This separation, which was attempted unsuccessfully a number of times in the PSTN, was finally brought about, among other things, by the rapidly falling cost of processing power and storage that enabled acceptable performance and reliability in spite of the "inefficiencies" and redundancies associated with such separation. The implications of this separation may affect the architectural design of NGN. Connectivity and transport layers can follow their own evolution dynamics distinct from the evolution dynamics of applications. The overall trend points towards commoditization of connectivity and differentiation of applications. This separation has the potential to unleash formidable competitive forces in the application space without requiring service providers to own their own connectivity or access infrastructure.

Whereas end devices in the PSTN are generally simple and fairly "dumb," hence the need for "intelligence" in the network, e.g., IN/AIN, CPE devices in NGN tend to be highly intelligent and sophisticated in their capabilities. PCs, laptops, PDAs, IP phones, cell phones, residential gateways, intelligent set top boxes and PVRs are some of today's examples of these high capability devices of both wired and wireless vintage. This does not obviate the need for intelligence in the network, however. In fact, a high degree of flexibility may be called for in NGN in which "intelligence" can reside both at the edge and at the core, and can at times dynamically migrate between the edge and the core to provide maximum flexibility and operational efficiency.

Unlike legacy networks, NGN may support multi-modal capabilities in delivering services to its customers. Each mode or medium may have its own unique connectivity/QoS needs. Furthermore, multi-party capabilities on-demand, where a participating party can be a human or a machine, may be supported for an increasing number of next generation applications (conferencing, gaming, collaboration). Contrast this to the current predominantly point-to point voice telephony in PSTN/AIN with a predetermined quality of service.

Mobility may become an integral part of most next generation applications. Whereas mobility is currently confined to circuit-switched cellular service, it is highly probable that user mobility (where the application user physically changes location while using or invoking the service), terminal mobility (where the end device can be "plugged" or otherwise connected to the network at different locations), and application mobility (where an application can be accessed from different networks and locations) will all become part of the defining characteristics of next generation services. This may result in full wireless-wireline convergence, a convergence that will ultimately be made complete by the ubiquitous use of packet switching and IPv6 in all wireless and wireline networks.

Whereas in the pre-NGN era most services are provided by the service provider that typically owns its own connectivity infrastructure, NGN application space may be crowded by third-party application service providers (ASPs), a natural consequence of separation of connectivity from applications. There are a couple of other reasons for this as well: One is that the pre-NGN network is/was generally closed to $3^{rd}$ parties (even the limited "open AIN" architecture was never fully implemented) and hence services offered on that network were necessarily provided by the owner of the physical infrastructure. This lack of openness has had its roots in security considerations, existing regulatory regime, and absence of key standards and enabling technologies. Secondly, unlike NGN, the existing service providers typically offer one type of service, albeit with many "features," over their infrastructures. Thus, phone companies offer voice telephony services, cable companies offer video entertainment services, and ISPs offer Internet access and limited application services bundled with access (e.g., email, calendaring, etc.). However, because NGN may support all application services, as mentioned in the previous section, and because a single provider will likely never be able to keep pace with Internet-centric application development and rollout on its own, the primary next generation service providers may have to support, and possibly mediate, the flow of $3^{rd}$ party applications to their customers.

Finally, shorter time to market and lower cost of application trial and rollout, compared to current legacy paradigms, and the ability to competitively differentiate applications and their features are desirable in a market place that is becoming increasingly less regulated and fiercely more competitive. Such differentiation may well have to do with how applications can interwork and interact with one another to give rise to a richer and more sophisticated and useful end-user experience. This "feature/application" mixing and interaction may pose a difficult architectural challenge to be addressed in NGN service architecture design.

NGN Service Architecture Alternatives: Motivating the Need for a Middle Layer

Considering the separation of applications from the underlying connectivity network, the great variety of NGN application services, as well as other points of departure mentioned above, there may be two distinct for application development, rollout and support in NGN: At one end of the spectrum, one can perpetuate the existing paradigm of Internet application development depicted in FIG. 1, and extend it with some tweaks to NGN. In this paradigm, each application comprises all the capabilities that it requires entirely within itself. The fundamental shortcomings of this "silo" model of application development may be summarized as follows:

1. A set of common capabilities needed by a wide range of applications may have to be developed over and over again resulting in unnecessary duplication of effort and wasting of resources.
2. In this paradigm, the end users would typically face inconsistent experiences moving from one application to another.
3. Because an application and its needed supporting capabilities are developed entirely independent of other applications, this may limit interworking among applications in ways that can enhance users' experience.
4. "Silo" development paradigms are typically more expensive in the long run unless one is interested in offering very few application services. Again, this has to do with the duplication of development efforts, which typically leads to longer time to market for applications beyond the first few. Even when applications are acquired in whole or part, or offered by (hosted) 3rd parties, integration and testing efforts in silo environments generally lead to higher costs and longer time intervals.
5. The "silo" model of application development may deprive the service provider of the opportunity to develop and deploy a unified service management architecture. Again, silo-based service management may become entirely application specific and costly beyond the first few services.
6. The "silo" model of application rollout may deprive the next generation service provider of the opportunity to change the business model in offering applications, for example, by positioning itself as a trusted intermediary in delivery of all services including 3rd party applications.

Figure 2:
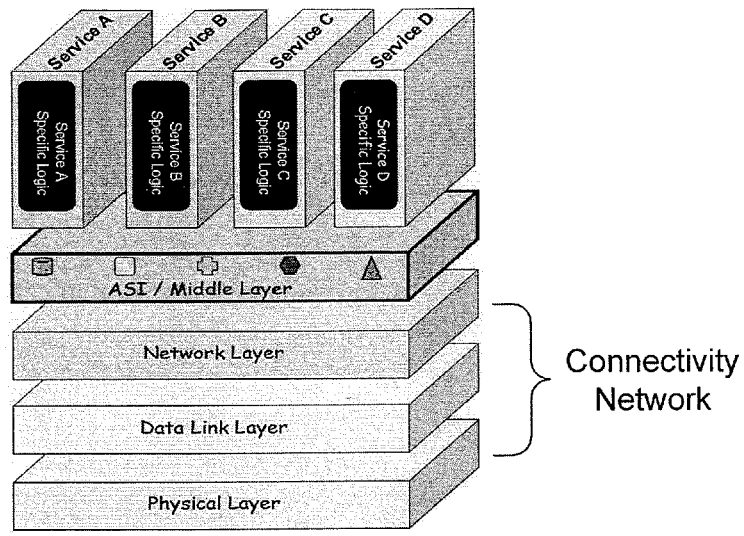
FIG. 2 is a diagram of an ASI-based alternative to the silo model in accordance with some embodiments of the present invention.

A viable alternative to the "silo" model of application development and rollout, according to some embodiments of the present invention, is depicted in FIG. 2. Here, a set of capabilities that are deemed common across multiple applications (represented by objects of various shapes) are pulled out of the individual applications, abstracted, and architected in a separate distinct middle layer called the Application Services Infrastructure (ASI). Different applications then use these middle layer capabilities on a need basis to provide the customers with their full range of functionalities. Customers can also access some of these middle layer functions independent of particular applications when it makes sense for them to do so. Some generic capabilities provided by the ASI/middle layer include, but are not limited to: authentication (single sign-on), presence and availability, mobility management, user and device profile, directory services (both people and services), security management, notification, subscription, session control, service brokering, QoS management, access to PSTN, and potentially a large number of other reusable capabilities. The main criteria for classifying a capability as an ASI/middle layer capability or service is actual or potential reusability across multiple applications. Middle layer services may interface with the applications through northbound interfaces, with the connectivity network through southbound interfaces (e.g., for managing QoS), and with the customers through web-based interfaces (over an appropriate access like DSL). In addition, middle layer service components can interact with one another in support of an application.

In FIG. 2, connectivity services are provided by the lower three layers (collectively referred to as the connectivity network), ASI services are provided by the middle layer, and application services are provided by the different applications. Different modules or functional entities within each layer need to communicate with one another. Sometimes a module needs to invoke another module through a remote invocation process. Other modules may need to pass data to one another at various points during the execution of their functions. OAM&P data may be continuously collected and exchanged. All these may point to the need for a ubiquitous communication and messaging infrastructure in a distributed processing environment (DPE). Some candidate architectures and technologies include grid computing, web services, SIP, etc. Furthermore, there are many functions that have to do with management of different entities, as well as policies in each layer. A number of management capabilities can be recast into management services architected on the same service infrastructure. Other management capabilities may be extended to end users (i.e., customer network management). Tentacles of management may touch all levels of the architecture.

Figure 3:
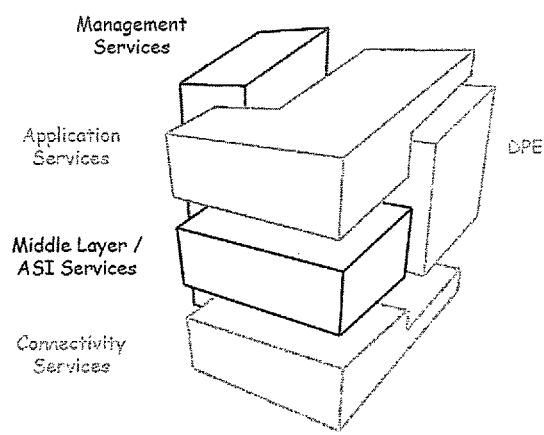
FIG. 3 is a diagram that illustrates components of next generation networks in accordance with some embodiments of the present invention.

FIG. 3 shows a rubric that attempts to depict the ASI model from different viewpoints in accordance with some embodiments of the present invention. The front view of the rubric depicts a "logical" view of the model while the side view provides an "implementation" view. The implementation view exposes additional detail not visible in the logical view: (1) The Distributed Processing Environment (DPE), which provides the "glue" allowing components in the blocks visible in the logical view to communicate with one another without being concerned about details of distribution; and (2) a Management Services block that serves all of the other blocks.

More on the Benefits of the Middle Layer

Although potential advantages of a middle layer, such as ASI, have already been alluded to, some of these will be discussed further from the vantage point of various parties, such as customers, service providers, and 3rd party ASPs.

From an end user's vantage point, ASI and its capabilities may provide several advantages: A first advantage is the access the customer can get to ASI services in a way that is independent of any particular application. For example, the customer can access the directory service in ASI through a web interface to browse and locate people as well as applications and their descriptions (a supercharged white/yellow pages on people and applications). The customer can access a profile service or a presence and availability service in ASI to create and edit his/her profile and availability, or can access a subscription service to subscribe to an application service and set up a billing profile, etc. A second advantage of ASI is that specific functions within the ASI layer may allow the customer to mix, match, and compose various application services (to the extent that they are compatible) to create more useful and sophisticated interactions. The session control function within the ASI layer, for example, may allow a user to invoke a multimedia communication session with another user and on demand (i.e., without prior reservation) add to the same session other parties (e.g., someone on a PC, or a cell phone) and other machines or applications (e.g., a video server, a web server, or a gaming server). Feature interactions between and within such composite services may be taken care of by ASI resulting in useful enhancements to user's experience and productivity. A third ASI advantage to the end user is the underlying sharing of customer-specific data, such as preferences, service data, and subscription data across all relevant applications and the presentation of a unified interface containing such data, among other things, to the end user. Fourth, the existence of ASI may enable the end user to invoke a large number of 3rd party applications in a uniform way without having to deal with the non-application specific functions of the application (such as authorization, billing, presence, etc)

From a service provider's vantage point, as discussed above, long term cost savings and reduction in time to market of application services due to minimization of duplicate efforts may be quite significant. In addition, ASI may provide a powerful means of differentiation in a very competitive environment by allowing a service provider to customize middle layer functions. Such differentiation can occur at different levels. For example, at the user interface level, ASI may enable a rich, unified, and consistent experience for access to all categories of services. It can enable a high degree of customer control and customization. The middle layer may hide the complexities and inconsistencies the customers would otherwise experience in dealing with third party ASPs by providing consistent common capabilities (somewhat analogous to a consistent "copy/cut/paste" capability across different Windows applications). Finally, ASI may allow a service provider to change the business model in providing application services by positioning itself as the trusted "primary" or "continuous" service provider or intermediary, depending on the application, that satisfies all communication, entertainment, information, and data needs of its customers.

From the third-party service provider vantage point, the middle layer may allow ASPs to focus on developing their specific application logic (their core competency) without being encumbered with development of support capabilities for their applications. Most, if not all, of the generic application support components may be provided by a service provider through ASI. Because the customer may have a choice of accessing somewhat similar services directly from ASPs (or indirectly through other service providers), the middle-layer architecture may be made more powerful, attractive, easy to use, and cost effective not only to end users but also to the 3rd party ASPs.

Middle Layer/ASI Functional Components

Figure 4:
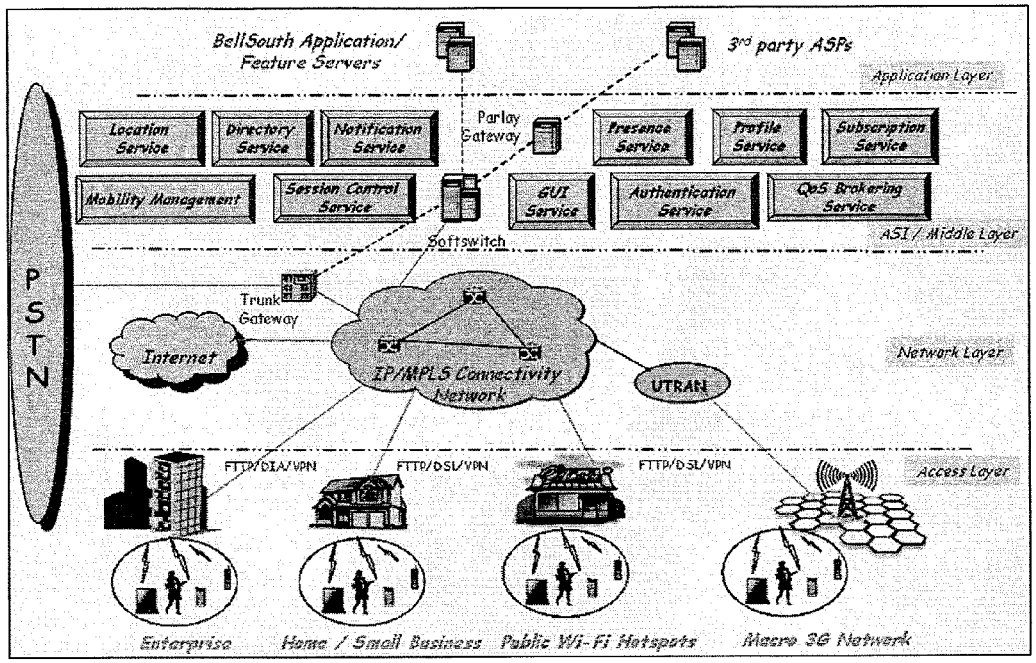
FIG. 4 is a diagram of a next generation network incorporating an ASI/Middle layer in accordance with some embodiments of the present invention.

FIG. 4 depicts a representative set of functional entities that can be part of the ASI layer (the entities shown in the middle layer), and how they relate to the rest of the NGN architecture in accordance with some embodiments of the present invention. To recap, one criterion for including a capability in the middle layer is its actual or potential reusability across multiple applications. Another criterion is to ensure that the middle layer entities are as independent from individual applications as possible. This criterion may be applied tactfully as there may arise a need to build some application "awareness" into specific ASI modules. A case in point is a middle layer functional entity that can be labeled "Feature Interaction Manager." By its nature, such a module may involve some level of application awareness, although efforts may be made to reduce such dependency.

ASI may provide a shared infrastructure approach; components may be designed to provide application service providers with reusable service enablers that they otherwise would have to develop as part of their applications. This shared services delivery approach may enable application providers to focus more resources on the development and delivery of application features and functionality. Development teams can focus on business logic and business processes primarily, without being too concerned about how to do authentication, billing, notification, and/or other service support functions.

As shown in FIG. 4, the ASI middle layer services may include, but are not limited to, mobility management, session control, user interface/portal, authentication, bandwidth/QoS, subscription, profile, presence, notification, directory, location, and/or softswitch/media gateway controller. These exemplary middle layer services will now be briefly described:

1. Mobility Management
   The mobility management service may provide a capability for applications to enable roaming of the end user and seamless hand-off of applications that have been invoked and are currently in progress. The critical instantiation of mobility management has to do with roaming and seamless handoff of voice telephony between a cellular circuit-switched network, such as GSM, and a wireless IP network using wireless local area network (WLAN), such as 802.11 operating in an unlicensed spectrum, and interfaced to a wireline high-speed Internet access technology such as DSL.

2. Session Control
   A session is a generalization of a call and defines a context, or a container, within which various applications can be brought together. The session control function may manage this context for complex multiparty, multi-media services. It may be used by applications for setting up and initializing the context, inviting other users, requesting resources, specifying QoS, enforcing user policies, possibly managing the feature interactions among applications, and more. Feature interaction may require some dependency on specific applications.

3. User Interface/Portal Service
   The end users of different application services may be supplied with a unified and easy-to-use interface (predominantly graphical but also voice-oriented on some devices) that allows them to invoke applications and manage their personal and service data. Although the portal/UI server may have hooks for specific applications, the overall portal service framework may be architected in an application independent manner with a high degree of extensibility and customization.

4. Authentication Service
   The authentication-service may provide authentication and authorization (and possibly CDR/SDR generation) features to allow users to invoke applications, and applications to conduct transactions in a secure manner. The framework, as well as the applications, may rely on the authentication service to validate user and device credentials to ensure that only authorized entities are able to access services and computing and network resources. Single sign-on may be an integral part of the authentication service.

5. BW/QoS Brokering Service
   The bandwidth/QoS brokering service is responsible for requesting and allocating connectivity resources to users and/or applications, and for helping configure the network with the correct behavior for the defined service. The brokering service may negotiate with underlying network entities with respect to requests to establish needed connectivity between endpoints and submits connection instructions to elements in the IP/MPLS core and access networks via the DPE messaging mechanism. Admission control may also become part of the BW/QoS broker.

6. Subscription Service
   Subscription service may allow users to subscribe and manage their subscriptions to various services. The subscription service may act as a clearinghouse to establish subscriptions, validate billing/credit information, send subscription notices, and integrate with a billing service to establish the appropriate information base to generate usage records.

7. Profile Service

The profile service may provide a way for applications to access and manage common user data that may relate to user account, user subscriptions, user preferences, and user devices. Such information can include email addresses, phone numbers, calendar and scheduling information, service options, and user reachability preferences (e.g., preferred mode of contact during a particular time interval). Profile entries typically refer to an individual or device, but could refer to almost any concrete object or abstract entity. The profile service may store the attributes associated with the entity.

8. Presence Service

The presence service may aggregate user and device reachability information across applications and networks. Presence information may be provided via an API to approved requesters so that they can reach the user appropriately. This common shared presence infrastructure serves as a basis for a variety of presence-based services, including presence enabled contacts (PEC), online gaming, push-to-talk, instant messaging, chat, conferencing, etc.

9. Notification Service

The notification service provides a mechanism for applications to send notices to users and/or devices either on demand, or at a specific future time, on a scheduled basis. Messages are delivered to their targets based on user/device profile information. The user of the notification service may also be able to request delivery confirmation. The notification service can perform limited content transformation when needed.

10. Directory Services

The middle layer may provide a common information repository that includes a user directory as well as an application service directory. The directory service may manage information about service providers, service features, and service metadata, providing functions similar to Universal Description, Discovery, and Integration (UDDI) specification. Another feature of the directory service may be to contain and furnish "Real Pages" information, i.e., information about users and businesses.

11. Location Service

The location service may aggregate information about physical/geographical location of the user/device as well as information on which network or network entity is currently serving, or capable of serving, the user's device. Feeds from various networks, including cellular, WiFi and GPS infrastructures, can provide the raw data to the location service.

12. Softswitch/Media Gateway Controller

A fair number of applications may need to communicate with a PSTN user. One way of doing that is through a softswitch architecture involving a media gateway controller (plus a signaling gateway) that control a trunking or media gateway. Other ways also exist for interfacing NGN and the PSTN, including, for example, pure SIP gateway interworking functions that may be built into PSTN switches or on a stand alone basis.

Other middle layer ASI components include a Call/Session Detail Record (CDR/SDR) service to feed a billing application, a Parlay Gateway to provide easy-to-use APIs to 3rd party ASPs, a Media Bridge Service to support transport of video/audio/data streams between participants and service facilities in a conference, and potentially other reusable components.

IP Multimedia Subsystem (IMS) Implementation of the Middle Layer

The 3rd Generation Partnership Program (3GPP) has developed a set of architectural specifications primarily around the SIP protocol that comes close to constituting the beginnings of a middle layer to support next generation applications. An overview of the salient features of IMS is provided in this section and a comparative analysis of IMS with ASI functional entities is provided in the next section.

IMS Overview

The IP Multimedia Subsystem (IMS) is an architectural framework specified by 3GPP as a foundation for IP-based services in 3rd generation mobile systems. Its specifications have been created as an evolved part of the GSM Core Network (CN). Its design objective is to efficiently support applications involving multiple media components, such as video, audio, and tools, such as shared online whiteboards, with the possibility to add and drop component(s) during the session. These applications are called IP multimedia applications (or "services"), and are based on the notion of "session" as defined by IETF in the Session Initiation Protocol (SIP). As envisioned by 3GPP, IMS enables Public Land Mobile Network (PLMN) operators to offer their subscribers multimedia services based on, and built upon, internet applications, services and protocols. The intention is that such services be developed by PLMN operators and other third party suppliers, including those in the Internet space, using mechanisms provided by the Internet and IMS. Thus, in 3GPP's vision, IMS would enable unified access to, voice, video, messaging, data and web-based technologies for the wireless user, and combine the growth of the Internet with the growth in mobile communications.

In an effort to maintain interoperability with wireless and wireline terminals across the Internet, IMS attempts to be conformant to IETF "Internet Standards." Therefore, the interfaces specified do conform, as far as possible, to IETF standards for the cases where an IETF protocol has been selected, e.g., SIP, DIAMETER.

To transport IMS signaling and user data, IMS entities use the bearer services provided by the Packet Switched (PS) domain and the Radio Access Network (RAN), referred to as the "bearer network" in the IMS specifications. With some exceptions, the PS domain and the access network consider IMS signaling and IMS application flows as user data flows, hence the minimum impact on non-IMS entities. As part of the bearer services offered by the PS domain to the IMS, the PS domain supports the handover functionality for maintaining service continuity while the terminal changes location.

The complete solution for the support of IP multimedia applications consists of terminals, IP-Connectivity Access Networks (IP-CAN), and the functional elements of IMS. An example of a wireless IP-Connectivity access network is the GPRS core network with GERAN (GPRS/EDGE) and/or UMTS Radio Access Network (UTRAN). The IP multimedia subsystem uses the IP-CAN to transport multimedia signaling and bearer traffic. The IP-CAN maintains the service while the terminal moves, and hides these moves from the IP multimedia subsystem.

IMS Services Concepts

The IMS architecture has been designed to allow services to be provided primarily by the Home Network (which contains the user's IMS subscription). There are also capabilities in IMS to enable services out of the Local Network (or visited network), which allows IMS subscriber access through a trust relationship with the home network.

Within the Home Network, IMS supports subscriber access to both operator-provided services (such as SIP based AS and CAMEL-based AS), as well as $3^{rd}$ party-provided OSA-based services through the provision of an OSA/Parlay API between the $3^{rd}$ party Application Server (AS) and the network.

Figure 5:
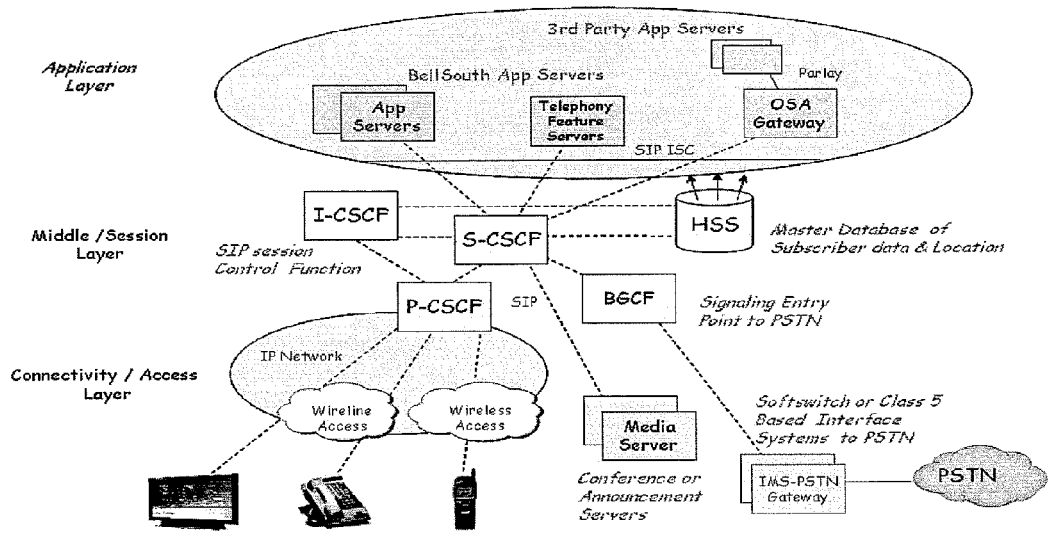
FIG. 5 is a diagram of a next generation network incorporating an ASI/Middle layer that includes IMS elements in accordance with some embodiments of the present invention.

The IMS architecture is based on the principle that the service control of Home subscribed services for a roaming subscriber is in the Home network, i.e., the Serving Call Session Control Function (S-CSCF) is located in the Home network. A conventional IMS network architecture is shown in FIG. 5. Services can be provided using two possible scenarios: The service platform (AS) can be located either in the Home Network, or in an external network. The external service platform (OSA-AS) can be located in either the visited network or in a $3^{rd}$ party platform. The standardized way for secure 3rd party access to IMS services is via the OSA framework. The Proxy-CSCF enables the session control to be passed to the right Serving-CSCF. The Serving-CSCF is located in the home network and may invoke the service logic.

IMS Entities and Their Functions

Various functions provided by IMS will now be described with reference to FIG. 5.

Proxy-Call Session Control Function (P-CSCF): This is the "first contact point" of IMS. Its initial task is to contact the I-CSCF in the Home Network of the user upon receipt of a SIP Register message from UE. It may also perform some access functions such as number translation, QoS policing, policy enforcement, admission control, SIP compression, etc.

Interrogating-CSCF (I-CSCF): This is the "main entrance" of the home network. Upon receipt of the SIP register message forwarded from P-CSCF, it selects the appropriate S-CSCF by interacting with and querying HSS. It then forwards SIP messages to the proper S-CSCF. It may also hide the internal topology of an operator's IMS network from entities outside that network.

Serving-CSCF (S-CSCF): This entity performs the actual session control. It performs SIP registration, handles the SIP requests, performs the appropriate actions (e.g., requests the home and visited networks to establish the bearers), interfaces to various application servers, and forwards the requests to the S-CSCF/external IP network of other end users as applicable. It may also translate an E.164 number to a SIP URI using a DNS function. The S-CSCF may be specialized for the provisioning of a (set of) particular service(s).

Home Subscriber Server (HSS): This is the main data storage for all subscriber and service-related data in IMS. User identities (public and private), registration information, access parameters, and service triggering information are among the data hosted by HSS. In addition to data related to IMS functionality, HSS contains a subset of Home Location Register and Authentication Center (HLWAC) used by both the packet switched (PS) and circuit switched (CS) domains.

Breakout Gateway Control Function (BGCF): This is responsible for choosing where a breakout to PSTN occurs. Thus, it would choose the specific IMS-PSTN Gateway that would handle the interworking between IMS and PSTN. Such a gateway can be a legacy Media Gateway Controller (and associated Signaling Gateway) controlling a Media Gateway with trunks to the PSTN. Other PSTN-IMS interface technologies, such as an adjunct to a class 5 switch, are also possible.

OSA Gateway and Application Servers: There are two ways an application server can be used by the IMS infrastructure: One way is to directly interface a SIP-based AS to S-CSCF using the ISC interface. Alternatively, an application server (particularly a 3rd-party application server) can use an intermediate Parlay/OSA gateway, which in turn interfaces to S-CSCF through the ISC interface (see the next section on OSA/Parlay). Mechanisms also exist within the specifications to interface to the legacy services like AIN (e.g., through the CAMEL Service Environment).

OSA/Parlay

A Joint Working Group composed of the ETSI TISPAN OSA Project, 3GPP, 3GPP2, the Parlay Group, and some member companies of the JAIN community, are defining an API specification for third party service applications, known as the Open Service Access APT, or OSA/Parlay API. Using this API, service application developers may access and use network functionality offered by network operators through an open, standardized interface.

OSA/Parlay is, therefore, a mediator API between Telecom networks and third-party applications, and may provide a secure interface between network operators and application servers. By using open APIs and raising the programming abstraction level, the OSA/Parlay effort is generally pursuing the following objectives:

1. To enable the creation of a large number of new applications in and around the network for enterprise and consumer markets using network features and capabilities;
2. To enable new revenue opportunities for network operators and new business models for service providers;
3. To encourage network operators to open their networks to third-party service providers, or to offer third-party developed services; and
4. To enable network operators and service providers to deploy many new applications and services.

In addition to OSA/Parlay APIs, the Joint Working Group has issued OSA/Parlay X Web Services Specifications. The Parlay X Web Services Specifications define a set of highly abstracted telecommunication capabilities (i.e., a simplified Parlay API) following a simple request/response model using Web Services (SOAP/XML) technologies.

OSA/Parlay Architecture

Figure 6:
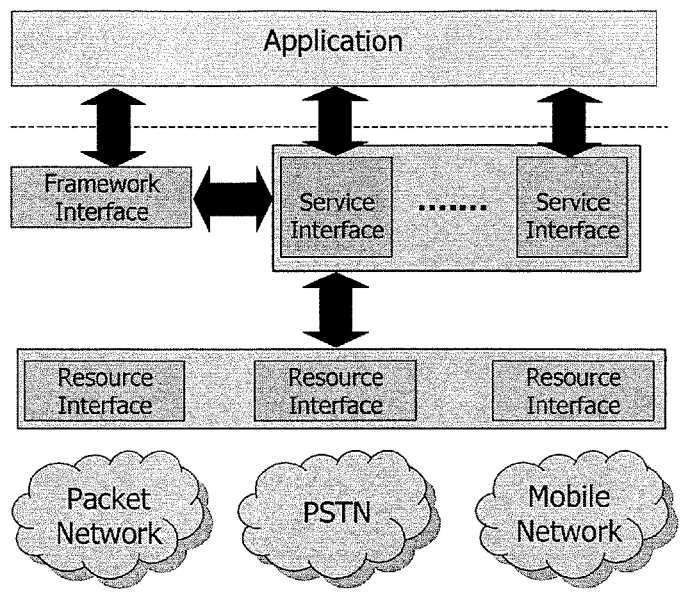
FIG. 6 is a diagram of the OSA/Parlay architecture.

The OSA/Parlay architecture is primarily focused on network and protocol independent service APIs for third party access in fixed and mobile networks as shown in FIG. 6.

The OSA/Parlay APIs are split into three types of interfaces classes:

APIs between the (OSA/Parlay) applications and framework, which provide applications with basic mechanisms (e.g., authentications, service discovery, service subscription, access control, etc.) to access the service capabilities in the network.

APIs between the (OSA/Parlay) applications and services, which provide the applications access to OSA/Parlay Service Capability Features (SCFs).

Interface classes between the framework and the services, which provide the mechanism necessary to support multi-vendor deployments.

Relationship of OSA/Parlay to ASI

In a sense, OSA Parlay offers a specific "packaging" of a subset of ASI components. Such components, however, not only can participate in an OSA/Parlay architecture "package," but can also be used (through additional interfaces) by non-OSA/Parlay entities. OSA/Parlay may provide a more constrained, and hence more secure, environment that may be especially suited to third party application service providers. ASI, and to a lesser degree IMS itself, may provide a more flexible and varied set of capabilities in a more loosely defined environment suitable for use by "trusted" applications. In a broad sense, however, OSA/Parlay and ASI have similar goals:

- To provide the mechanism to expose capabilities/features offered by network operators to third party service providers.
- To provide an open, standards interface for third party applications to access network capabilities and features. OSA/Parlay Group may define a set of north bound, secure and open interfaces between the network operators and third party applications, thereby raising the network capabilities to a programming abstraction level. This abstraction level, according to OSA/Parlay, may allow multi network applications and may facilitate application development from the IT community because telecom expertise may not be required.

More specifically, however, OSA/Parlay and ASI architecturally approach the middle layer from different perspectives:

- ASI focuses on the definition of services capabilities/functionality and applications that are essential, common, and/or reusable across multiple applications, such as session control, service management, user profile, QoS Broker, etc. The OSA/Parlay service capabilities (SCSs) exposed to third party applications may be mostly associated with network capabilities and connectivity, such as call setup, mobility (location and status), user interaction, etc.
- ASI components may be defined with enough details to allow the vendors to build products that will be compatible with service provider's infrastructure. OSA/Parlay leaves the service capability servers (SCS) to vendor implementation and treats SCS like a black box.
- Communication between ASI components are allowed and defined per application needs. Requirements may be provided to specify the interactions/interworking amongst ASI components, and between ASI components and the underlying transport network either directly or via intermediary components (e.g., QoS Broker). Communication between OSA/Parlay SCS is not defined and is not in the scope of Parlay Forum work.
- ASI provides choices for the northbound interface to applications. Options include SIP, OSA/Parlay API, Web Services, etc.
- OSA/Parlay SCSs are defined and accessed only by third party applications. ASI service components/applications can be packaged and subscribed by ASPs but accessible to end users. One example of ASI services that can be accessed by end users is common login, authentication, and subscription. This may provide a single and common interface to end users to subscribe and access third party applications and network operators' applications.

Evolution of IMS to ASI

The capabilities in the middle layer and how such capabilities are (or are not) provided by IMS, how they are envisioned by ASI, and how the initial versions can be enhanced over time to fit into the target ASI architecture will now be described. Neither the list of functional entities, nor the comparisons, are intended to be exhaustive.

As discussed above, a session is a generalization of a call and defines a context, or a container, within which various applications can be brought together. The session control function may manage this context for complex multi-party, multi-media services. It may be used by applications for setting up and initializing the context, inviting other users, requesting resources, specifying QoS, enforcing user policies, possibly managing the feature interactions among applications, and more. Management of sessions is a candidate for location in the middle layer because many activities that use network connectivity can be seen as being part of a session. The description below provides an overview of session management in the IMS architecture and derives requirements for ASI session management. It also provides a high level comparison of session management under the two architectures.

Session Management in the IMS Architecture

Figure 7:
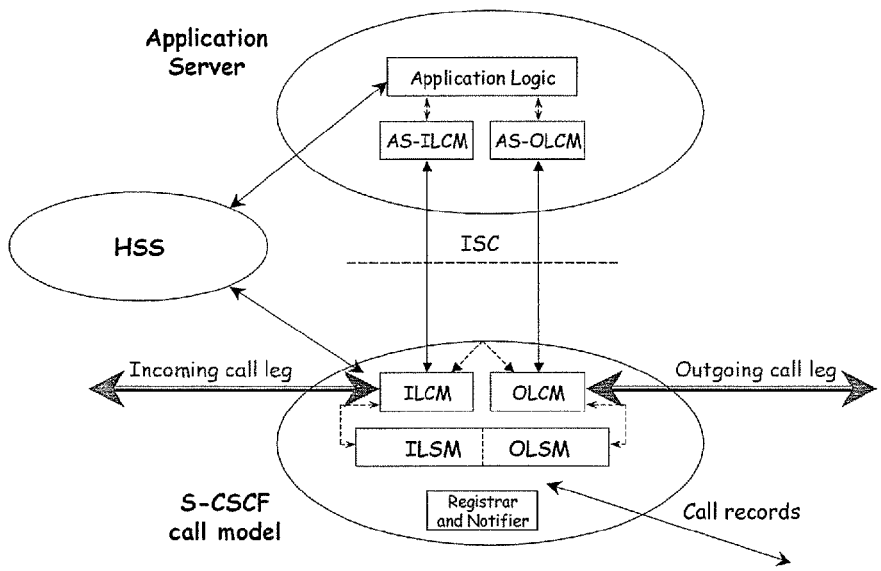
FIG. 7 is a diagram of Call Session Control Function/Application Server interaction in accordance with some embodiments of the present invention.

The IMS architecture supports session management functionality in the Serving CSCF, which plays a central a role in the IMS architecture as can be seen in the high level IMS architecture diagram of FIG. 7.

SIP dialogs are a central part of the IMS Session Management concept. A SIP dialog starts with an initial SIP message (e.g., REGISTER, INVITE) tracked from end to end, and includes all responses to that message. The dialog is identified by SIP header information, allowing intermediate entities to associate any received message with its dialog. Intermediate entities in the path between the two users (P-CSCF, S-CSCF, etc.) are guaranteed to stay in the signaling path for all responses to the initial SIP message by adding their own SIP URI as a "via" header to the initial SIP message as part of their processing of the message before sending it on. For subsequent dialogs related to this dialog that may be started, intermediate entities have the option of remaining in the signaling path if they choose by adding appropriate header information to the initial SIP message. If this occurs, subsequent dialogs can be associated with the original dialog, allowing the signaling entities to maintain a coherent view of the end-to-end user interaction. In addition to the passive roles of proxy and redirect servers, intermediate entities in the signaling path (e.g., an application server) can choose to terminate the initial SIP message and, acting as a back-to-back user agent (B2BUA), initiate new SIP dialogs of their own in the interest of serving the users' needs. In addition, a third party entity can start SIP dialogs without receiving any initial SIP signaling from end user equipment (3rd-party call control).

In the IMS context, the term "session" refers to the bearer connections joining two or more users. A session is the result of a set of SIP dialogs between various users that result in a set of bearer paths between two or more entities (which can be users or network entities such as media servers).

The processing of SIP messages at the S-CSCF includes interactions with zero or more application servers. The application servers can be standard SIP application servers, OSA application servers above an OSA/Parlay gateway, or CAMEL application servers above an appropriate adaptation layer. Each application server can act as a SIP proxy, an originating or terminating SIP user agent, or a SIP Redirect Server as needed to provide necessary services to the users. These interactions are governed by a set of Initial Filter Criteria (IFC) that are downloaded from the Home Subscriber Server (HSS) by the S-CSCF and processed in the specified order so that the application servers are consulted as necessary and in the correct order. In addition or as a replacement, the S-CSCF can interact with a Service Capability Interaction Manager (SCIM) that in turn can interact with other application servers. The interaction between S-CSCF, HSS, and a particular AS is shown in FIG. 7.

Session Management in the ASI Architecture

The ASI session controller has a central role in the ASI architecture, which articulates how the various ASI infrastructure elements (including the session manager) interact to provide a typical service to end users in accordance with some embodiments of the present invention. In general, the session manager is responsible for the overall context of a complex multi-party, multi-media, multi-application session. Applications (such as multimedia videoconferencing) use the session manager as a conduit through which they (1) Receive requests to participate in sessions; (2) Get access to resources needed to provide the services; (3) Benefit from the user leg abstraction provided by the session manager that allows the application to not be concerned with transport layer connections; (4) Get access to token management needed to maintain control over sessions; and/or (5) Get access to other middle layer AST functionality such as presence services, charging capability services, and notification services. Note that applications may also have direct access to the other middle layer AST capabilities; it is not required that the session manager mediate all access.

The session manager's view of a particular overall service session can be split into several sub-sessions:

A single provider session: this part of the overall session is the abstraction of the session as viewed from the perspective of the service provider. The provider session can be initiated either by a user session or by a scheduler. In general, a provider session will "contain" multiple providers, multiple users, and multiple media types.

Zero or more user sessions: A user session is an abstraction of the participation of a single end user in the overall session. The session manager maintains one or more user service sessions for each end user that is involved in the service. More than one user service session for a particular user may be needed when the user is simultaneously participating in the session in multiple ways (potentially using multiple devices). Examples of this are: (1) A user connected to a conference via a PC client and a handheld computer simultaneously; and (2) A user connected to a conference and simultaneously participating in a side-bar chat session with another conference participant.

The ASI session manager can handle two types of end users that have potentially different service capabilities consistent with their roles. A controlling user has a larger set of capabilities than passive users involved in the same session. He or she would typically pay for all of the activities associated with the session. As an example, the leader of a videoconference would be a controlling user. If two members of the videoconference decide to have a sidebar chat (with the permission of the controlling user), the controlling user would pay for the chat session. The controlling user is the only user who is capable of ending the overall session. In a conference type application, the controlling user session would be related to the user having control over conference resources, for example, floor control, camera control, shared white board master control, ability to call a vote, and ability to record notes or issues. A passive user, as the name suggests, is unlikely to have any capabilities beyond passive participation in the service. Examples: users calling into a bridge set up by someone else, consumers of video streams ordered by someone else, or a called VoIP user.

Summary:

Provider Session capabilities: The abilities to start, end, suspend, and resume provider sessions may be provided. A provider session is started at the request of a user session (corresponding to a Controlling, Active, or Passive user and done with intervention from the "hovering" application service), and ends when it is no longer needed (e.g., a conference has ended or a web browser is closed). Note though that ending a particular user's session in this way may not imply that the user is completely disconnected from the network; indeed, the user is most likely still authenticated and active from the perspective of the ASI layer, and may have other user sessions active with other application services.

User Session capabilities—controlling user: The user associated with the Controller's session may have the ability to start and end controller sessions to allow a controlling user access to the service. Suspend and resume abilities may also be provided in the event that the controller wishes to suspend/resume the overall provider session. In addition, the controlling user may wish to leave (i.e., disassociate itself from the provider session) temporarily without causing the overall session to end.

User Session capabilities—passive user: Users associated with Passive Users' Sessions may have start and end capabilities even though these less privileged users may not need to worry about the provider session ending just because they have disconnected.

Scheduler capabilities: The session manager may be able to recognize a third party scheduling entity that arranges for sessions to be initiated at some future time. The scheduler may be able to (1) Schedule future sessions; (2) Cancel a scheduled future session at the request of a user; and (3) Initiate a scheduled session when triggered by the scheduler's internal timer event.

Figure 8:
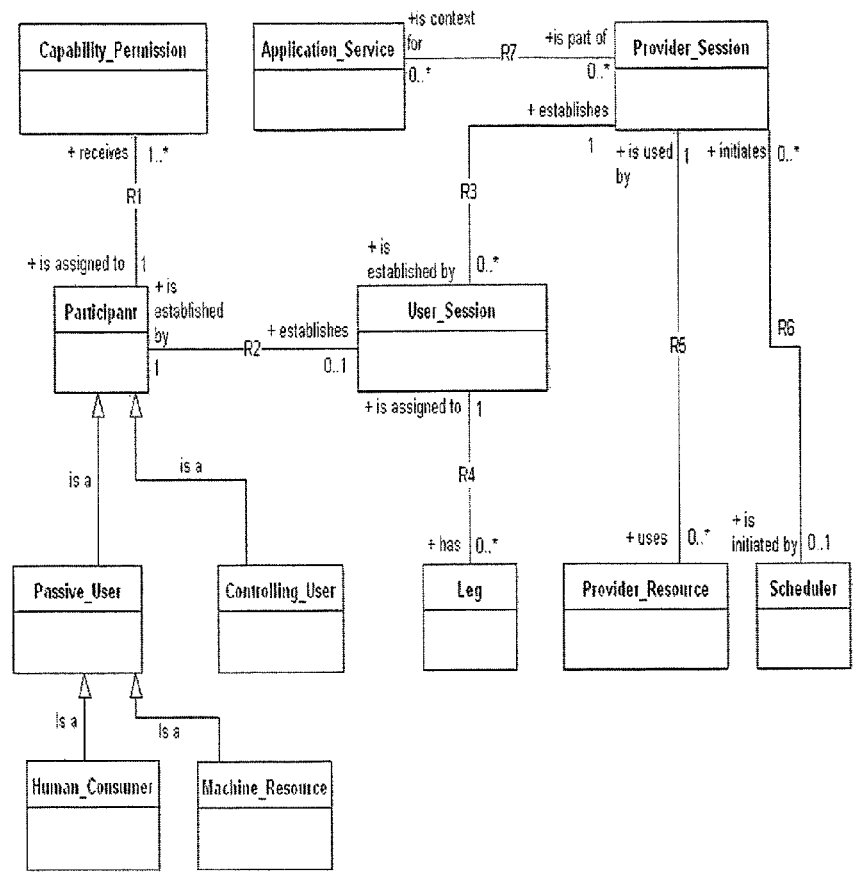
FIG. 8 is a diagram of an ASI Session Service Class model in accordance with some embodiments of the present invention.

Other requirements can be derived from a high level class model for session management such as the one shown in FIG. 8. The class diagram comprises of a set of classes that are linked by various UML relationships, including associations numbered $R_1$, $R_2$, and so on and generalizations (inheritance), in accordance with some embodiments of the present invention. Each association shows the cardinality and a role at either end. Thus the association between "User Session" and "Leg" is labeled to show that the User Session has 0 or more related legs, while the leg is assigned to exactly one User Session. An example of a generalization relationship is the class diagram's specification that there are two types of users (controlling and passive) that both inherit the properties of the user class via a relationship labeled "is a."

Scheduler functionality: A scheduler function may be included that is responsible for scheduling, canceling, and triggering provider service sessions according to the needs of end users.

User Capabilities: The user's ability to engage service features may be governed by ownership of a set of capability permissions, which may be tokens set up by the application service developers. An example of a capability permission is "conference leadership"—initially, this token may be held by the controlling user; however, at some point the leader may want to pass the token to allow another person to moderate a portion of the conference.

Session resource management: A provider resource class may be used to model various resources that may be made available to provider session instances that need them, for example, an A/V conference bridge.

Multi-user management: The session manager's ability to bind a number of bearer streams to form the context of a session may be modeled by relationship R4.

Multi-application management: The session manager's ability to manage several application services in the context of a single session may be modeled by relationship R7.

Application interaction with Session Manager and other ASI infrastructure elements: The session manager may be able to accept control of the session from an application (or from another ASI infrastructure via the application).

Multiple user types: the Session Manager may be able to handle use cases pertaining to multiple types of users, including controlling users, passive users, and schedulers.

Determinism: The logic for proceeding through Session Manager use cases may proceed to a single exit point.

Session Management: IMS Evolution to ASI Architecture

A summary of at least some of the key elements of each of the architectures that are not common to both architectures is provided below:

AS-centric architecture: Unlike ASI, IMS generally leaves most of the context management for the "threads" of a session context, the multiple users, media streams, and applications, to the application server. In the ASI architecture, the Session Manager has generally more responsibility for managing the overall context.

Interaction between SM and AS: ASI does not define the interaction between the session manager and application servers to the level of detail specified by IMS. This goes beyond specifying the ISC interface. It includes the initial filter criteria for each user that are stored in HSS that the S-CSCF may consult with. In addition, IMS requires the session manager to download these filter criteria so as to be ready to determine which application servers will be involved for each initial SIP message.

Feature interaction management: IMS handles FIM in two ways: (1) Via the order in which initial filter criteria are compared to incoming SIP messages—this ordering results in the set of application servers relevant to a particular SIP dialog being consulted in a specific order; and (2) Leaving the door open to additional feature interaction management methodologies by allowing a Service Capability Interaction Management (SCIM) to be (logically) located between the S-CSCF and application servers. Little is currently specified in 3GPP for SCIM functionality. ASI views the functions of feature interaction to be an integral part of session management.

Mobility Application Server Interaction: The IMS ISC interface extends the ASI northbound interface beyond SIP AS and OSA/Parlay gateways to supporting the IM-SSF function for CAMEL services. However, support of CAMEL is straightforward under ASI.

Single session manager: ASI session management assumes that a single session manager handles all interaction between users for a particular service context. Thus, a single session in general can handle multiple users, multiple applications, and multiple media. IMS takes a more localized view—in particular, each mobile user has its own session manager, which means that two S-CSCFs may be involved in calls between mobile users. Because of this, IMS requires cooperation between session managers (with assistance from an I-CSCF, possibly with a topology hiding internetworking gateway).

Access to the session manager: While the IMS P-CSCF and I-CSCF entities have no direct counterparts in the ASI architecture, their roles in IMS session management are generally limited. ASI views most of the proxy and interrogating CSCF functions as part of basic access control architecture.

Maintaining overall control of a session: In ASI, the Session Manager is assumed to retain control of each session until the session is torn down. In IMS, the S-CSCF is able to hand a session off to an application server, which may contain a terminating user agent that essentially takes over control of the session. The S-CSCF stays in the call path using via and record route headers.

Point-to-multipoint Signaling: ASI leaves multipoint signaling to the session manager without defining the way in which it is to be implemented. IMS specifies SIP forking (the ability of an entity such as a SIP proxy that receives a SIP INVITE message to forward the INVITE to multiple destinations).

Interaction with other middle layer functionality: The design of the ASI middle layer has the Session Manager interacting (with the assistance of the application) with other ASI components such as charging. IMS allows (in fact, requires) the S-CSCF to interact directly with some of these types of functionality, with charging being a prime example.

Suspend and resume: IMS supports suspend and resume, but only for individual SIP legs. ASI allows an entire session (including multiple users, applications, and media) to be suspended and resumed.

Hierarchy of user types: ASI supports several types of parties that participate in a session. It is a requirement that there be one and only one controlling user per session. Controlling ownership may be passed to another party in some embodiments. Passive users have a smaller set of capabilities than the controlling user. An example is a conference participant.

Multiple communications sessions in a single session: Adding a new communications session to an existing user relationship (e.g., setting up an IM chat session between two participants in an existing conference) requires adding new SIP dialogs and binding them to the existing dialogs in the application server (and/or perhaps in a Service Capability Interaction Manager). Extending a session in ways like this is a central capability of ASI session management—the session manager easily extends the session context.

Mobility Management

Mobility management refers to a set of capabilities that allows the user to roam from a wireless circuit switched domain such as GSM into a wireless IP domain such as WiFi/DSL (and vice versa) while maintaining the continuity of the in-progress voice calls. When in the GSM domain, the calls to/from the user would be GSM calls. When in the WiFi domain, the calls to/from the user would be VoIP calls. When both domains are available for a particular incoming or outgoing call, preference is given to WiFi. Mobility management is an interim capability that may be needed as long as the macro wireless network uses a circuit switching technology like GSM. When the macro wireless network evolves to an IP-based (3G/4G) network, the need for a specific mobility function may disappear. Mobility and handoff may be handled at the network level using, for example, IPv6. A subscriber with this service is reached using a single directory number regardless of whether he/she is in a GSM or a WiFi domain. The mobile device used in such a service may be a dual mode handset with both GSM and WiFi radios. In the GSM domain, it may act like a regular GSM/GPRS/EDGE cell phone, while in the WiFi domain it may act like a VoIP phone running an IMS client. All voice features like call forwarding, call waiting, 3-way calling, and voice mail may work uniformly and transparently across the two domains. The WiFi network that provides IP connectivity to the dual mode handset can be back-ended by wireline DSL or any other high-speed Internet access technology. The service may be appropriate for use in residential or enterprise markets, as well as in public WiFi pockets that continue to spring up rapidly at airports, cafes, hotels, fast food outlets, bookstores, etc. It should be noted that the subset of aggregate voice traffic that ends up being carried over the broadband IP network to/from the dual mode handset may relieve congestion on the macro cellular network that uses scarce licensed radio spectrum. WiFi networks operate in an unlicensed radio spectrum.

Functional Overview

Figure 9:
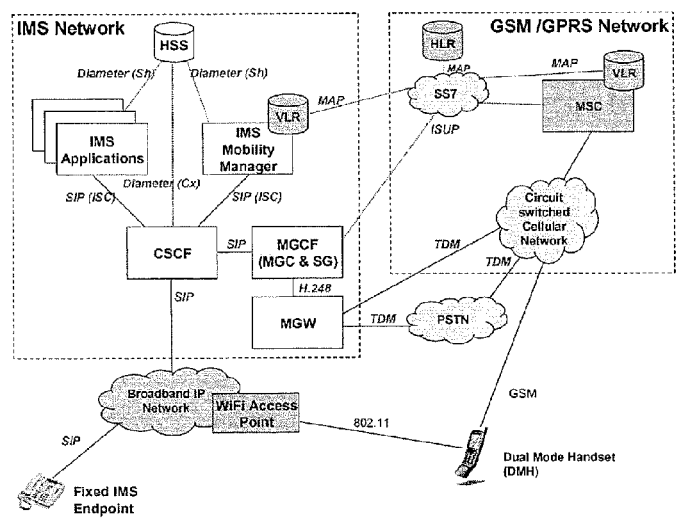
FIG. 9 is a block diagram of an IMS Mobility Manager in accordance with some embodiments of the present invention.

The mobility management architecture described here, in accordance with some embodiments of the present invention, is one of several potential alternatives that can be used depending on business model assumptions. The description should be considered illustrative rather than prescriptive. It assumes a standard IMS network and a standard GSM/GPRS/EDGE network, and bridges the two networks through the introduction of a new application server called the IMS Mobility Manager (IMM). The IMM supports the use of a Dual Mode Handset (DMH), which has the ability to operate in both the GSM network and the IMS network, using WiFi for access in the latter. The IMM appears to the IMS network as a standard SIP application server. To the GSM network, it appears as a visited Mobile Switching Center (MSC). The IMM service logic provides the ability for a DMH to roam and to handover calls between the IMS and GSM networks. FIG. 9 illustrates a simplified schematic architecture showing how the IMM would fit into a typical combined IMS and GSM network in accordance with some embodiments of the present invention. Because the IMM operates as a standard IMS application server, it may support the standard SIP-based ISC interface to S-CSCF like any other IMS application server. It may also support the Diameter-based Sh interface, which allows it to retrieve IMS-related subscriber information from the HSS. Because the IMM must also appear to the GSM network as a visited MSC, it needs to have the ability to interact with the Home Location Register (HLR) using MAP protocol and it must support VLR functionality.

Roaming Between IMS/WiFi and GSM Networks

The Dual Mode Handset (DMH) is equipped with two radios that enable it to operate in two different modes to provide wireless connectivity to both the GSM network and the IMS/WiFi network. Within the IMS network, the IMM is the only element aware of the dual nature of the DMH. The core IMS CSCF and other IMS applications treat the DMH as a standard IMS endpoint. It is the responsibility of the IMM to keep track of the current active mode of DMH and route calls to either the IMS/WiFi terminated side of the phone or its GSM side based on the currently active mode. When a user moves between access technologies, the DMH initiates registration on the currently active network, GSM or IMS/WiFi.

To support roaming between IMS/WiFi and GSM, the IMM needs to keep track of the network in which the DMH is currently active. There are times (hopefully very short in the interest of DMH power management) when DMH is simultaneously registered in both the GSM and the IMS/WiFi networks, e.g., to enable seamless handover of in-progress calls (described later). In general, when both networks are available, the DMH gives preference to the IMS/WiFi network.

When DMH roams into the IMS/WiFi network, the device will register with the IMS system using a standard SIP registration method. In this case the IMM may act like a visited MSC and make a location update request to the HLR in the GSM network to note that the user has moved into a new MSC. The IMM may note the state of the DMH as active in IMS.

When the DMH roams out of the WiFi network or is not connected to the IMS network, it may register with a GSM MSC and the cellular network's resources may be used to support the user's calls. In the case where the IMS system was the previous active network, the IMM will be informed by the HLR of the location update and will need to update the currently active mode of DMH.

DMH Terminating Treatment

The IMM may be involved in determining where to route calls destined for the DMH. Calls to the DMH that originate in the IMS system may be routed to the IMM via CSCF filtering criteria. Calls that originate in the GSM network or PSTN are routed to the IMM by designating the IMS network as the (virtual) gateway MSC for the user. In such cases, the MGCF/MGW entities in the IMS network act as the entry point of the call into the IMS network, which then would act as the virtual gateway MSC. This allows calls destined for the DMH user to be anchored in the IMS network, which in turn allows additional terminating IMS services to be provided to the DMH, even if it is currently active in the GSM network.

Once the IMM gets involved in call processing, it may route the call based on the last known mode of the DMH. If the DMH is currently registered in the IMS network, it may proxy the request unchanged to the IMS system. If the DMH is not currently registered in the IMS network, the IMM may query the HLR for the DMH's current location. If the handset is active on a GSM MSC, it may receive a roaming number from the HLR. The roaming number may allow the call to be routed via the MGCF. If the DMH is not currently active anywhere, either call forwarding or routing to voice mail numbers can be used when such capabilities are provisioned. Alternatively, the IMM can route the call back into the IMS system for unregistered IMS processing.

DMH Originating Treatment

Although the IMM does not directly affect originating service delivery, it is important to understand the issues related to providing originating services to the DMH based on its current mode. To make sure services are consistent across MSCs in the GSM network, a standardized set of services is defined in GSM that all MSCs must support. Adding new services in the GSM network may become difficult because the service must be implemented in all MSCs. In contrast, IMS introduces the concept of a home network whereby all calls to an IMS user are always routed to the user's home network regardless of the visited network. This may allow for new services to be easily added since they do not need to be introduced throughout the network.

Originating services for the DMH are normally provided by the network in which the DMH is currently registered. If the DMH is registered in the IMS network, new originating services beyond the standardized mobile services can be provided. If the DMH is registered in the GSM network, it normally would not be able to receive these new originating services. However, there are several options for anchoring DMH originating calls (e.g., when DMH is in the GSM network and makes a GSM/PSTN call) to IMS through forced routing via CAMEL triggers, special carrier access codes, or hot-lining. One advantage of such "anchoring" is that IMS is always in the signaling path of calls made from/to the DMH. This in turn means that call processing features for the DMH may come from the telephony application servers in IMS, rendering the service more uniform across the two domains. The anchoring may also facilitate call logging as well as the handover of in-progress calls between GSM and IMS when the user roams (more on this later). Note that the "hair-pinning" of calls that originate from DMH in the GSM domain to a GSM/PSTN number, or calls that originate in GSM/PSTN and terminate on DMH when it is in the GSM domain, may be rather inefficient in use of resources, a price that may be worth paying to put the IMS infrastructure in the signaling path of all calls to/from DMH and to facilitate seamless handover.

Call Handover when DMH Moves from IMS/WiFi to GSM

IMM is assumed to be in the signaling path of all calls to/from DMH, i.e., all calls to DMH are "anchored" in IMS. The DMH is responsible for monitoring the WiFi signal strength. At a certain point, the DMH could decide (based on signal strength) to move out of the IMS/WiFi network. When a change in network is needed, the IMM uses some stimulus or event to initiate the handover sequence. The actual stimulus is dependent on the type of handover being requested.

A DMH wanting to move from the IMS/WiFi network into the GSM network may initially register and request to handover the call to a new MSC in the GSM network via normal GSM procedures. The new MSC that "detects" DMH may notify HLR through a location update request, and HLR may in turn notify the IMM (acting as the existing MSC) of this request. The location update request is the stimulus for the IMM to initiate handover. From this point on, it is the IMM that may coordinate the handover. It will initiate a call transfer to the new (GSM) MSC via a temporary roaming number allocated by the new MSC. The IMM may use this roaming number to transfer the IMS call via standard SIP re-invite methods. However, the IMM may stay in the signaling path, which may allow it to hand-back the call to IMS/WiFi if needed. During the handover processing period, DMH is registered in both the IMS and GSM networks. When the call transfer is completed, DMH is expected to un-register from the IMS/WiFi network. Because the WiFi signal strength at times may deteriorate rapidly, the DMH may not be able to un-register before losing contact with IMS/WiFi. In this case the DMH may stay registered in IMS until the re-registration timer expires. The IMM may coordinate routing subsequent calls correctly to the GSM network based on GSM HLR registration status. Other approaches to providing IMS/WiFi to GSM handover are possible, such as using conference bridges and new messaging. Such approaches may involve non-standard GSM and/or IMS signaling procedures.

Call Handover when DMH Moves from GSM to IMS/WiFi

For handover from GSM to WiFi, it is assumed that the call is "anchored" in IMS. This ensures that the IMS-MGCF controlled MGW is in the bearer path and that the IMM holds the call session information. A DMH wanting to move from the GSM network into the IMS/WiFi network may initially request to be registered in the IMS network via normal IMS SIP registration procedures. DMH registrations are always filtered through the IMM. The registration request in the presence of an active GSM call can be used as the event to initiate handover. The IMM (not the DMH) may then coordinate handover via standard SIP transfer and GSM mechanisms. It may initiate an update location request to the (GSM) HLR and allocate a temporary roaming number. The currently controlling (GSM) MSC may be notified of the change in location and may use the allocated roaming number to transfer the call to the IMS network. The IMM detects the incoming request with the roaming number and through standard SIP re-invite transfers the call to the IMS/WiFi interface on the DMH.

Presence and Availability Management

Figure 10:
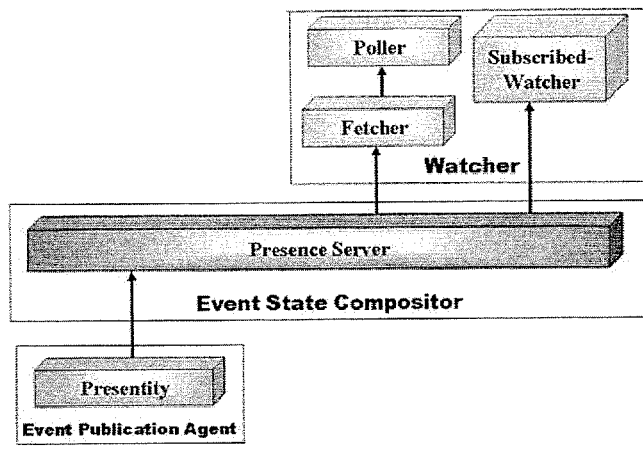
FIGS. 10 and 11 are block diagrams of Presence and Availability Management models in accordance with some embodiments of the present invention.

The concept of presence has emerged with Instant Messaging (IM) as a popular desktop communication service. Subsequently, the role of presence has expanded into various services. Today, presence has been extended to include the monitoring of registrations and busy/idle status of end user devices including wireless phones, VoIP clients, traditional POTS phones, etc. and is considered to be beneficial for usability of services such as Push-To-Talk and Instant Conferencing in corporate and consumer markets. As the number of end devices and presence-enabled applications grows, users may need control to enhance productivity while checking the potentially unwanted intrusion of communication and information probes into their lives. Availability management may provide the control essential for user comfort and adoption of new services. In addition to the presence information collected by the network, a user may define availability information—for example, he/she may wish to answer personal phone calls while at home and business ones from the home office. Presence and availability are often used synonymously; however, it is availability that is more useful to end users than presence. After all, if you need to communicate with someone, it may be more important to know if they are available to communicate with you than to know if their phone is on or if they are logged into an IM session. A basic model for the concept of presence, in accordance with some embodiments of the present invention, is shown in FIG. 10.

Presentities (entities whose presence and availability may be of interest) may provide presence information for watchers by communicating with the presence server. Watchers retrieve the presence information from the presence server. Watchers are entities (that could be applications) that use the presence information for any number of reasons—for example, to present the information on the screen to a user. The presence service shares the presence information with the watcher using notification.

The concept of presence has been addressed by various standards, many of which are application dependent and may not provide interoperability across applications. The Internet Engineering Task Force (IETF) has proposed a general framework for sharing presence information along with a set of event packages that can be used to specify the status of user clients. In addition, IETF has proposed the use of Session Initiation Protocol (SIP) for communicating presence information.

Presence and availability services may be independent of any specific application and can be shared by multiple applications which may make these services ideal candidates for the ASI middle layer. This sharing may make it easier for users to manage them for privacy and convenience, and easier for carriers to manage network protection and at the same time enable $3^{rd}$ party application deployment. As we shall see, however, most of the existing presence services (WV/IMPS, SIMPLE, etc.) are specialized and do not provide flexibility beyond the services currently envisioned for them, especially not for new services such as multimedia application services.

Presence in the IMS Architecture

Figure 11:
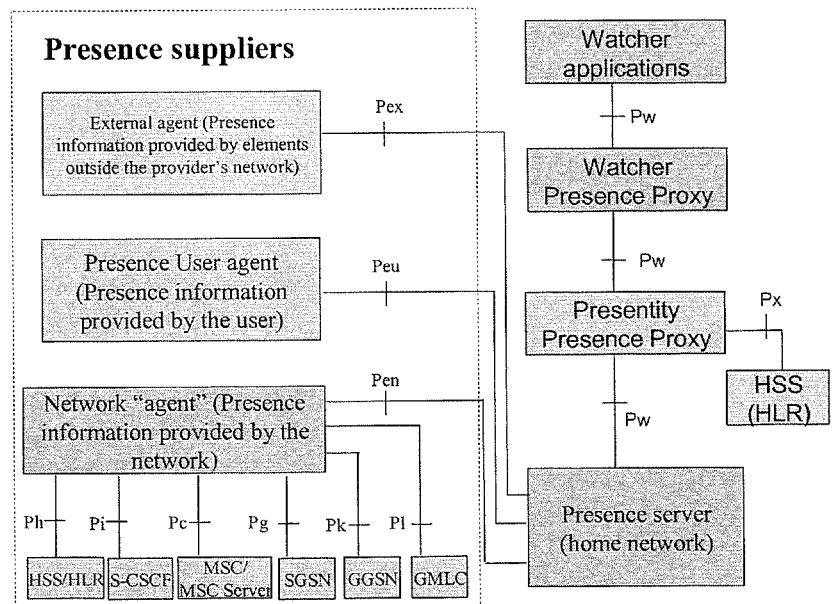

Presence has been a topic of standardization in a number of bodies including IETF, the PAM Forum, and 3GPP. 3GPP has defined a reference architecture for supporting presence services. In the 3GPP/3GPP2 standards, the presence server is a component distinct from the IMS, but something that can be used by both the SIP infrastructure as well as through an API via an OSA Gateway. 3GPP has decided on SIMPLE as the protocol to access presence in SIP infrastructure. At the same time, PAM specifications from Parlay have been adopted as the APIs for access to presence in 3GPP/3GPP2 through the OSA Gateway. The reference architecture based on Release 6 for presence service in 3GPP and 3GPP2 is illustrated in FIG. 11.

In the 3GPP standards, the presence server has been defined as a type of application server that receives and manages presence information from multiple presence user agents for a given presentity. Three types of user agents have been defined: presence user, network, and external agent. The presence server receives information from multiple sources and performs a transformation function to compose a single view to the watchers requesting presence information. Presence user agents provide explicit user status information to the presence server. Explicit user status information may include an indication that the user is not available to receive any communication. The presence network agent may use network status information to provide implicit status information about the end user to the presence server. In addition to receiving network updates, the presence service can poll the presence network agent to receive network presence information on demand.

Figure 12:
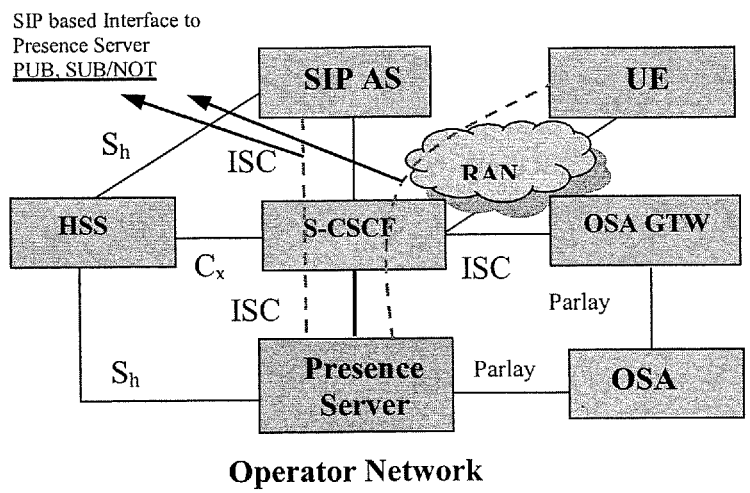
FIG. 12 is a block diagram that illustrates an IMS Presence Architecture in accordance with some embodiments of the present invention.

IMS-defined routing is used to access the presence service. FIG. 12 illustrates the main elements of the IMS architecture and shows how they relate to the presence service in accordance with some embodiments of the present invention.

The dotted lines in FIG. 12 represent the flow of SIP signaling (Publish, Subscribe/Notify) between the presence server, presentities, and watchers in the 3GPP model. The SIP AS can play the role of a watcher or presentity. The user equipment (UE) is a source of data for the presentity. The OSA GW provides access to the IMS network, including the presence service, for OSA applications; it can also play the role of a watcher or presentity.

Figure 13:
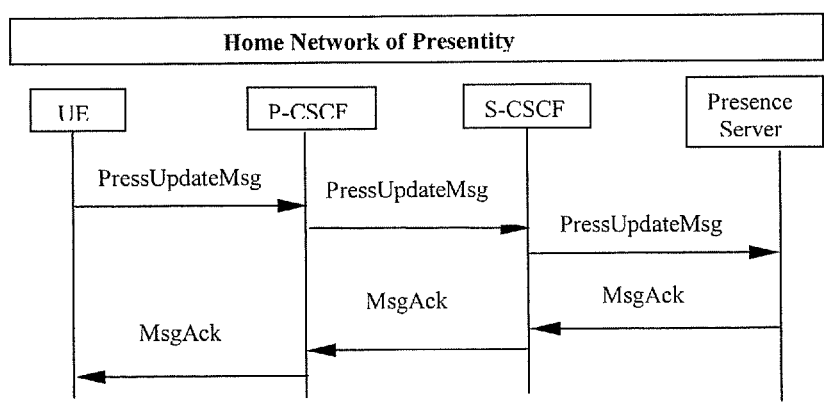
FIG. 13 is a flow diagram that illustrates updating IMS-based presence in accordance with some embodiments of the present invention.
Figure 14:
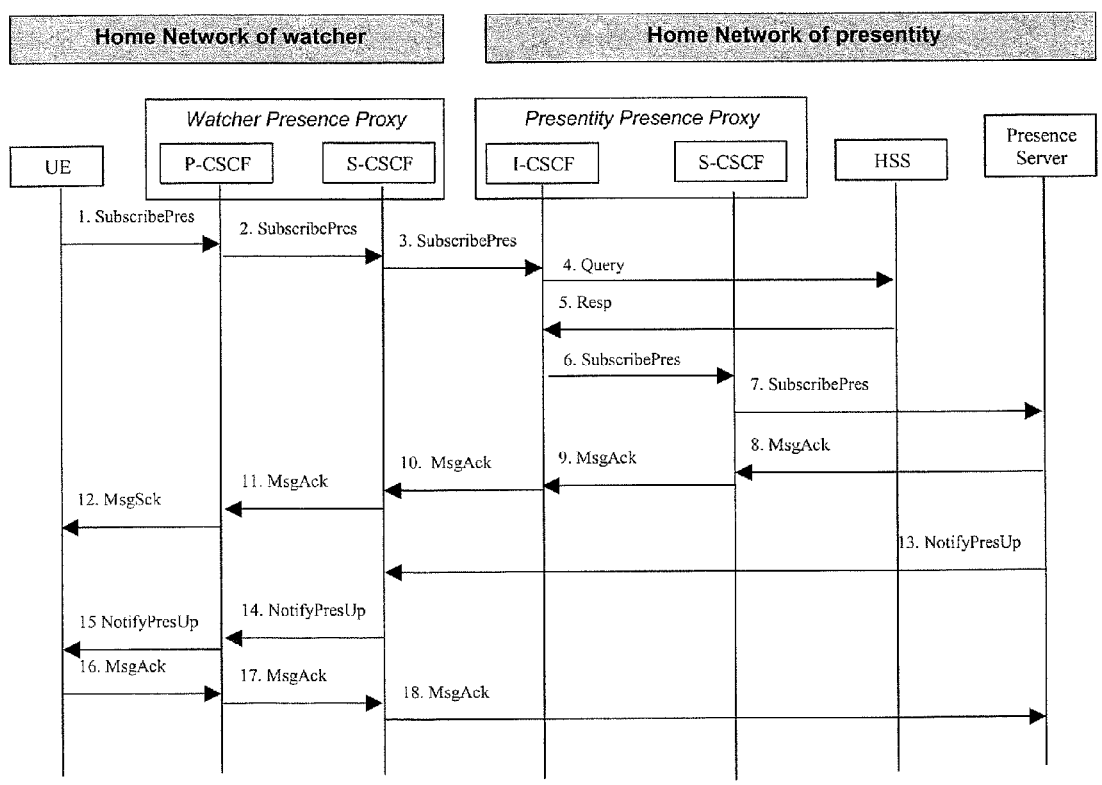
FIG. 14 is a flow diagram that illustrates subscribing to presence information in accordance with some embodiments of the present invention.
Figure 15:
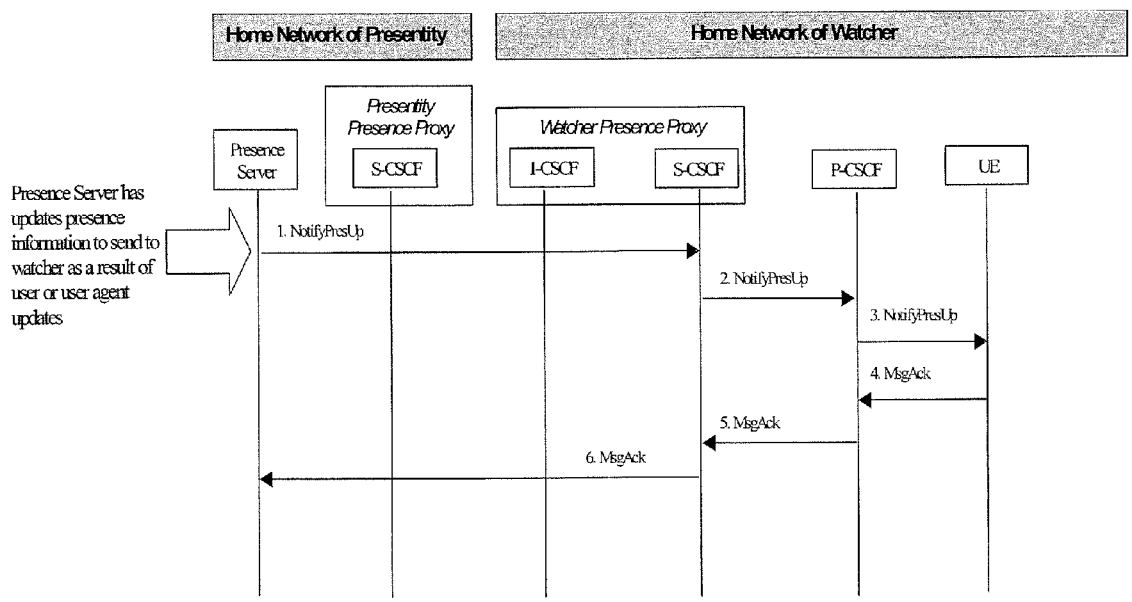
FIG. 15 is a flow diagram that illustrates notifying the watcher about changes in presence information in accordance with some embodiments of the present invention.

Within the framework defined by the 3GPP standard there are three major mechanisms for how the presence information is collected and distributed.
  Updating presence information;
  Subscribing to presence information; and
  Notifying the watcher about changes in presence information.
FIGS. 13-15 illustrate the flows for each of these mechanisms, respectively, in accordance with some embodiments of the present invention.

Presence in the ASI Architecture

Figure 16:
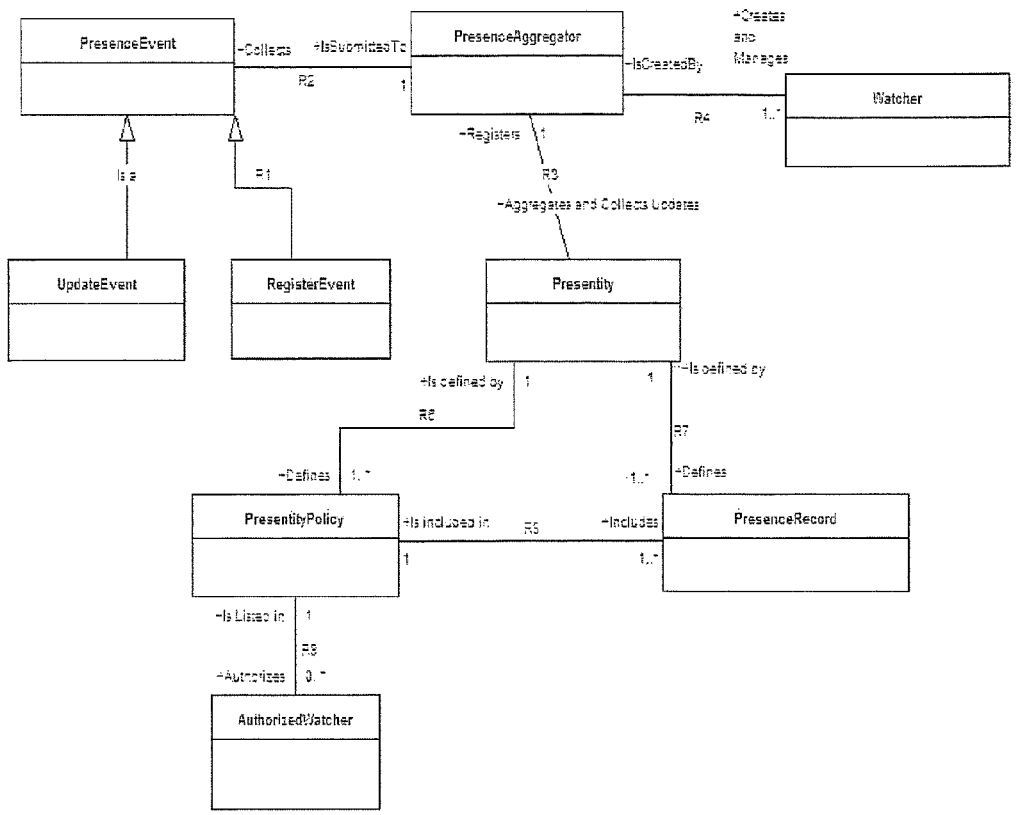
FIG. 16 is a block diagram that illustrates an ASI Presence Service Class model in accordance with some embodiments of the present invention.

Presence has been defined as one of the major domains in the ASI middle layer architecture. A single presence service manager may serve a collection of presentities and receives updated presentity status according to presence events. The presence service manager is responsible for handling presence subscription requests from watchers and notifying them about the presence status of the presentities. FIG. 16 illustrates a class model developed for the ASI presence service in accordance with some embodiments of the present invention.

Presence: IMS Evolution to ASI Architecture

The basic structure used to support presence in the ASI model is similar to that defined by the 3GPP standard for IMS. Both models are based on the separation of presentity and watcher roles and both define the presence service/presence manager as the center of the presence service with similar capabilities. The ASI model, however, abstracts the sources of presence into a single class of Presence_Event. The ASI architecture defines a generic class for presence events that is generated by the client devices/software that the presentity uses, as well as by network elements (for example, a geo-location system or a GSM HLR system). The 3GPP becomes more specific and distinguishes between three sources of presence: Presence External Agent, Presence User Agent and Presence Network Agent. The 3GPP defines a specific interface between the presence service and other applications that want to use the presence information while the ASI model groups application users into a generic class of Watchers. Two standards are defined within IMS for interfacing to application servers (ISC and OSA PAM APIs)—and 3GPP-compliant presence service must be able to support both interfaces. For the new IMS functionality, either standard IMS protocols (DIAMETER to HSS) are used or IMS routing infrastructure (CSCF/HSS) is used to covey SIP transactions (SIP PUBLISH for User Agents). The IMS model defines interfaces between the presence service and the sources of presence.

The possible sources of presence within a 3G network are varied. They include MSCs, HLRs, PDSNs, S-CSCF, and AAA servers along with User Agents. For the most part, existing protocols are used to capture presence information—LIF for MPCs and ANSI-41/MAP for HLRs, ANSI-41/CAMEL for MSCs and SGSNs.

In the 3GPP model, IMS-defined addressing/routing is used to locate and access the presence service; however, the ASI model does not provide that level of detail. On the other hand, the ASI model defines classes for maintaining the presence information and policies associated with the presence information. Therefore, the ASI model provides more high level guidelines on the implementation of the presence service. The 3GPP specification provides no information on how to implement presence in the network except for the definition of the interfaces. Overall, the two models are proximate and complementary.

While the IM-based application protocols can serve some of the initial communication applications, a presence service capability in the middle layer as defined by the ASI architecture may foster interest in the development community for services that bring revenue to the carriers by enabling faster growth of presence based applications. The IMS adaptation of presence services may drive the deployment of the ASI vision for middle layer presence capabilities.

User Profile Service

The user profile service may support the storage and retrieval of customer data as needed by applications and users. Currently, customer data is spread and often duplicated in different service providers' networks and applications. A logically centralized and physically distributed single user profile may be easier to manage, maintain, access and share.

The user profile is a collection of dynamic and permanent (i.e., infrequently changing) data about an individual end user which may affect the way the end-user experiences and pays for services; thus, the user profile may be shared among multiple applications. User profile data may include, but is not limited to:
  General information such as account number, user id, name, contact number, address, and language preferences
  Type of user (purchase decision maker or non purchase decision maker)
  Data that facilitate user authentication and service authorization such as password or PIN
  Generic privacy access control data specifying the entities authorized to read the user profile data
  Call treatment/routing preferences for call forwarding, call blocking, selective call acceptance, roaming, etc.
  Service data
    Subscribed services
    Usage preferences/service plan (premium, basic)
    Usage control
    Access restrictions
    Service customization data
  Terminal/device information and status (on/off)
  User geographical location
  Calendar
  Address book
  Buddy lists
  Billing plans and arrangements (e.g., pre-paid vs. post-paid, credit cards)
  Bookmarks
User Profile supports the concept of group creation and group management that can be used in the context of services.

User Profile in the IMS Architecture

User Profile functionality may be provided by two elements of the IMS architecture, which are now briefly described: the Home Subscriber Server (HSS) and the Generic User Profile (GUP).

Figure 17:
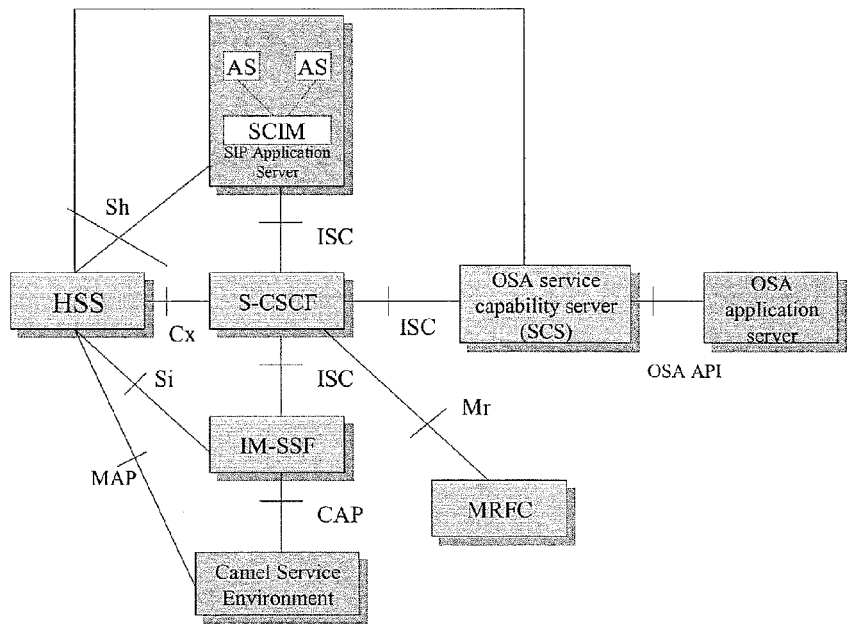
FIG. 17 is a block diagram that illustrates operations of the Home Subscriber Server for managing User Profile information in accordance with some embodiments of the present invention.

The HSS is the main data storage for subscriber and service-related data as shown in FIG. 17. The HSS also contains a subset of the Home Location Register (HLR) and Authentication Center (AUC) functionality for the packet switched (PS) and circuit switched (CS) domains. The HSS provides subscriber data to different IMS functional elements to assist these elements in processing requests and establishing calls and/or sessions.

CSCF: HSS stores the address of the S-CSCF serving the user to assist the I-CSCF to route SIP registration message from the user equipment (UE) to the correct S-CSCF. HSS stores the filter criteria to assist the S-CSCF in determining which application servers to forward the user's SIP requests to for further processing and the order in which application servers receive the SIP requests. HSS stores the data related to the user identity and security keys to assist the S-CSCF in the authentication and authorization processes.

Application Server: 3GPP defines the Sh interface between the HSS and application servers (AS) based on the Diameter protocol. The Sh Interface provides the mechanism for AS to retrieve user service-related data from HSS, such as registration information, user identities, initial filter criteria, S-CSCF name serving the user, address of the charging functions and user location information from the PS and CS domains. The Sh Interface also provides mechanism for AS to get a notification when a particular data for a specified user is updated in the HSS.

CAMEL Application Server (IM-SSF): The CAMEL subscription information in support of IMS services is stored in the HSS. 3GPP defines the Si Interface for the CAMEL AS to retrieve CAMEL subscription data from HSS including triggers. The Si interface is based on Mobile Application Part (MAP) protocol.

The following subscriber and service-related data may be stored in the HSS to assist various functional elements with processing requests and establishing calls and sessions:

Subscription, identification and numbering data
  Private user identity in the form of a Network Access Identifier. Private user identity is used to identify user's subscription and is mainly used for authentication purposes
  Public user identity, such as telephone number and SIP uniform resource identifier (URI)
  Barring Indication is a flag associated with each public identity to indicate that this identity is barred from any IMS communication except for registration and re-registration.
  List of authorized visited network identifiers associated with the public user identity to indicate which visited network identifiers are allowed for roaming.
  Services related to unregistered state parameter is associated with each public user identity to indicate whether the identity has services related to unregistered state or not.
Registration Data
  Registration Status: registered, not registered, deregistered
  S-CSCF Name identifies the S-CSCF that is serving the user when the user registers to IMS. The name is in the form of a SIP URL
  Diameter Client Address of S-CSCF is used when HSS sends requests to S-CSCF
Authentication and Ciphering Data
  Random Challenge, Expected Response, Cipher Key, Integrity Key and Authorization Token
S-CSCF Selection
  S-CSCF Server Capabilities contains information to assist I-CSCF in the selection of an S-CSCF.
Application and Service triggers
  Subscribed Media Profile Identifier identifies a set of session description parameters that a subscriber is authorized to request
  Initial Filter Criteria identifies the set of applications or services that a user SIP request may invoke
  Application server information specific to the user such as Service Key, Trigger Points, Service Scripts, etc.
  Service Indication identifies service-related transparent data
Core Network Service Authorization Data (further study needed)
Served subscriber location
User State: Busy, Idle, Not reachable, Not provided (CS domain), Detached, AttachedNotReachableForPaging, etc. (PS domain)
Charging Data
  Primary event charging function address to perform content charging
  Secondary event charging function address
  Primary charging collection function name to provide off-line charging
  Secondary charging collection function name
Data Related to CAMEL Support of IMS Services
  Originating IP Multimedia Camel Subscription Info: trigger points, trigger criteria, service key, gsmSCFaddress, default call handling
  Terminating IP Multimedia CAMEL Subscription Info: trigger points, trigger criteria, service key, gsmSCFaddress, default call handling
  Dialed Services IP Multimedia Camel Subscription Info: trigger criteria, service key, gsmSCFaddress, default call handling
  gsmSCF Address for IP Multimedia Camel Subscription Info: list of gsmSCF address to which notification on change of subscriber data is sent
  IM-SSF Address for IP Multimedia Camel Subscription Info: list of IM-SSF address to which notification on change of subscriber data is sent.

Figure 18:
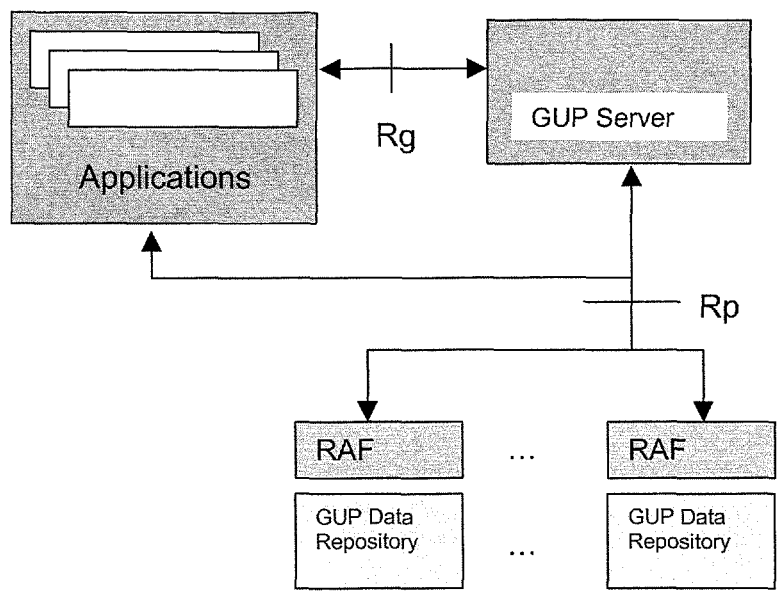
FIG. 18 is a block diagram that illustrates a Generic User Profile Reference architecture in accordance with some embodiments of the present invention.

The second IMS architecture element supporting user profile functionality is the Generic User Profile (GUP) concept as introduced by 3GPP in Release 6 to enable shared access to user-related information stored in different entities as shown in FIG. 18. This concept is more aligned with the ASI User Profile definition as being logically centralized and physically distributed.

The 3GPP GUP reference architecture may include the following:
  GUP Server, which is a functional entity providing a single point of contact to the user profile data. The GUP server supports the following main functions:
    Single point of access for retrieving and managing user profile data of a particular subscriber
    Location of Profile data for a particular subscriber
    Authentication of profile requests
    Authorization of profile requests
    Synchronization of profile data
  GUP Data Repositories where the primary copy of profile data is stored.

Repository Access Function (RAF) realizes the harmonized access interface. It hides the implementation details of the data repositories from the GUP architecture. The RAF performs protocol and data transformation when needed. The RAF provides standardized access to GUP Data Repository. RAF and GUP Data Repository are usually co-located in the same network element.

Reference Point Rg allows applications to create, read, modify and delete any user profile data using the harmonized access interface. Third party applications and third party GUP Data Repositories may be connected to GUP server only using the reference point Rg.

Reference Point Rp allows GUP server or applications, excluding third party applications, to create, read, modify, and delete user profile data using the harmonized access interface.

In the GUP reference architecture, a GUP Data Repository can be any of the following: HSS, HLR/VLR, application server, management servers like CRM, or user equipment (UE).

3GPP recommends that GUP should contain at least the following subscriber/user data:
Authorized and subscribed services information
    Authorized services to which the subscriber may subscribe
    Services to which the subscriber is actually subscribed
General User Information
    Settings (name, postal address)
    Preferences (language, etc.)
    Phone Books, Buddy lists
    Registered Service Profile of the user
PLMN Specific User Information
    User Address (e.g., IMSI, MSISDNs, URLs, email)
    WAP parameters (e.g., WAP gateway)
    GPRS parameters (in UE and HSS)
    Preferred access technologies (e.g., UTRAN, GERAN, WLAN, etc.)
Privacy Control Data
Service specific Information
    Service Identification
    Service customization data
    Service Subscription State (active, not subscribed, dormant, etc.)
    Service authentication and authorization data (e.g., keys, certificates, and passwords)
Terminal-related Data
    Terminal capabilities (user interface, communications, services, user preferences, etc.)
    Data for initial configuration and/or reset
    Backup data for recovery of the terminal configuration including service specific data
Charging and Billing related Data
    Billing policy
    Credit Card InfoUser Profile in the ASI Architecture The ASI User Profile may include one or more of the following features in accordance with various embodiments of the present invention:
Profile data may be logically centralized and physically distributed.
Profile data may be accessible through a common data model, regardless of where or how it is physically stored or provisioned.
Profile data may be accessible via standard protocols and open interfaces.
Profile data may be accessible to other ASI components.
Profile data may have extensible data structures and semantics.
The end users may be in control of what, when, how, or with whom their data is shared. End users may be able to specify access control policies.
The interface may include the following functions: read, create, modify and delete data.
Authorization mechanism may be supported.
Mechanism to discover where relevant profile data can be found and to publish data schemas may be supported.
Mechanism may be provided to allow network elements and applications to subscribe and to be notified of changes in profile data to ensure data synchronization.
Profile server may meet high reliability and real time performance requirements.
User Profile may support the concept of group creation and group management.
Applications and other ASI components using Profile service may be able to request notification of updates in data associated with a specific user.

User Profile: IMS Evolution to ASI Architecture

The IMS HSS may be a starting point for the ASI User Profile. The HSS is defined as the main storage for all IMS subscriber and service-related data that can be accessible to authorized application servers via a standardized (Sh) interface. It may satisfy the ASI user profile requirements to be the centralized point of contact for all user profile data. However, the concept that all subscriber and service-related data resides in the HSS element may not be practical. In reality, user data is distributed in the user equipment/devices, home network and service provider's environment. 3GPP's GUP is generally more aligned with the ASI user profile concept because its architecture supports a server as a single point of contact for subscriber and service-related data, with the actual data residing in different locations.

Notification Service

A notification service may provide a shared reusable mechanism for applications to send messages to users and/or devices, either on demand or at a specific time. Messages are delivered to their targets based on user location and user/device profile information. If needed, a notification service may also perform content transformation.

Notification Service Functionality in the Core IMS Architecture

The IMS Serving CSCF (S-CSCF) and Home Subscriber Server (HSS) components may provide the functionality necessary to implement a notification service function.

The HSS stores subscriber profile and preference data. In support of the notification function, the HSS stores the user notification profiles and preferences for the delivery of notifications.

Figure 19:
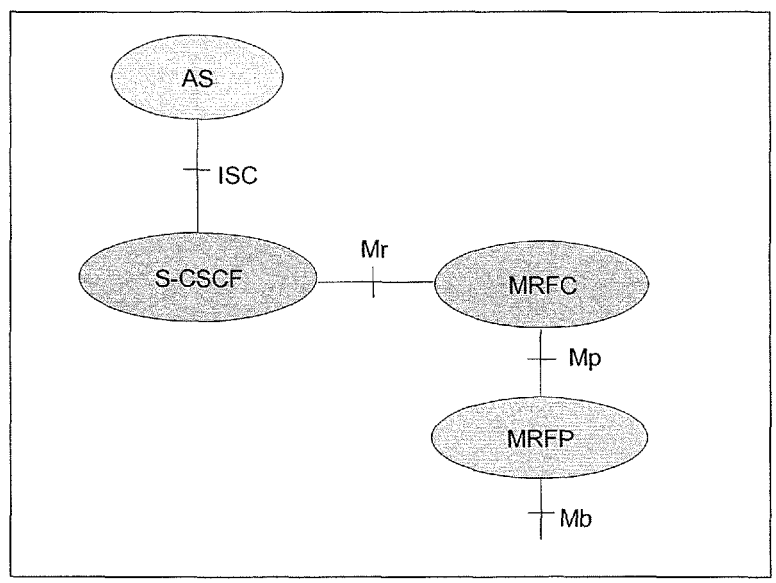
FIG. 19 is a diagram that illustrates a Multimedia Resource Function in accordance with some embodiments of the present invention.

The S-CSCF performs session control services for the users and applications. It maintains session state information as needed by the network operator for support of the services. Within an operator's network, different S-CSCFs may have different functionality from one another. In particular, the S-CSCF communicates via the SIP protocol over the Mr interface with a Multimedia Resource Function (MRF) within IMS, which performs content adaptation services (e.g., audio transcoding), if required. The S-CSCF forwards SIP messages to the MRF for processing, as shown in FIG. 19.

The MRF is split into a Multimedia Resource Function Controller (MRFC) and a Multimedia Resource Function Processor (MRFP).

Tasks of the MRFC may include, but are not limited to, the following:
- a Control the media stream resources in the MRFP.
- Interpret information coming from an AS and S-CSCF (e.g., session identifier) and control MRFP accordingly.
- Generate call detail records.

Tasks of the MRFP may include, but are not limited to, the following:
- Control the bearer on the Mb reference point.
- Provide resources to be controlled by the MRFC.
- Mix incoming media streams (e.g., for multiple parties).
- Provide media stream source (for multimedia announcements).
- Process media stream (e.g., audio transcoding, media analysis).

Use of 3GPP Push Functionality

The push services functionality defined by 3GPP may also provide functionality to implement a Notification Service function. Methods for supporting push services by 3GPP delivery networks apply to the IMS domain and other existing delivery networks, including the 3GPP Packet Switched (PS) domain, Circuit Switched (CS) domain, Multimedia Broadcast/Multicast Service (MBMS), and Wireless Local Area Network (WLAN).

Figure 20:
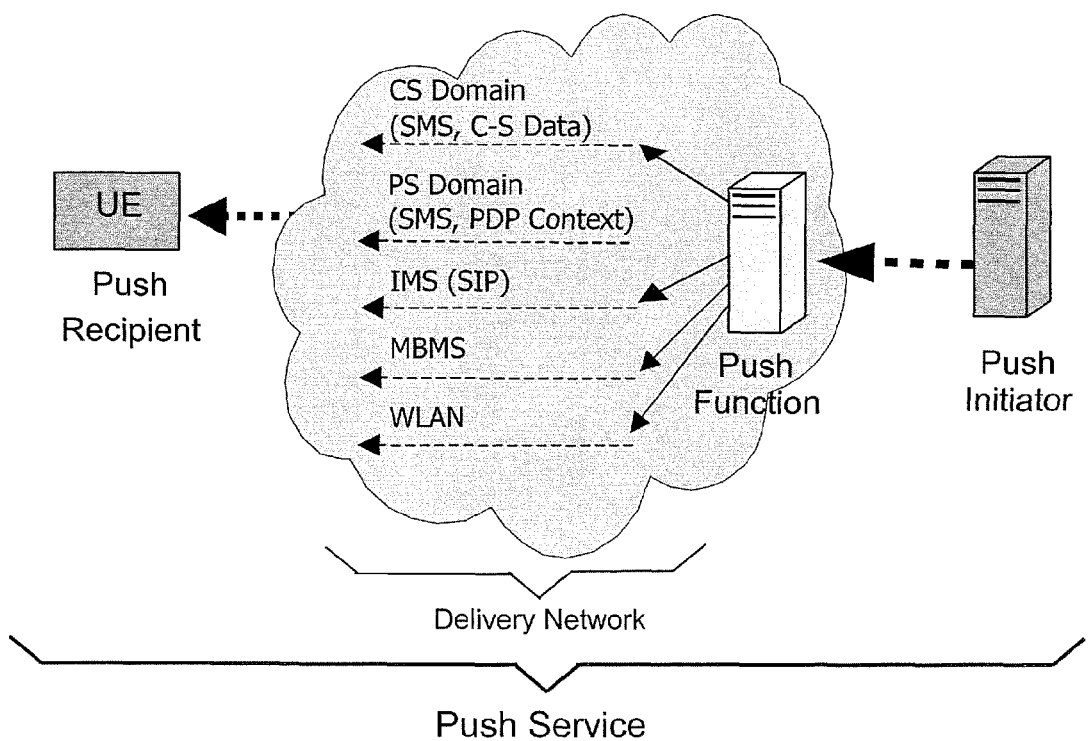
FIG. 20 is a block diagram that illustrates a Push Service Architecture in accordance with some embodiments of the present invention.

The IMS Push Service architecture overview shown in FIG. 20 includes the Push Application Servers, Push Function (or Push Proxy) and Push Initiator as well as the delivery networks available and the Push Recipient or UE. The definition of functionality in the Push Function (Push Proxy) and Push Initiator are not specified by 3GPP. FIG. 20 shows the Push Function performing delivery network selection; the definition of how this is performed and the criteria for delivery network selection are part of the definition of the Push Function and are outside the scope of current 3GPP specifications. FIG. 20 depicts the Push Function being located within the PLMN: this is a logical representation of the Push service architecture and does not imply the physical collocation of a Push Function within the PLMN infrastructure.

Figure 21:
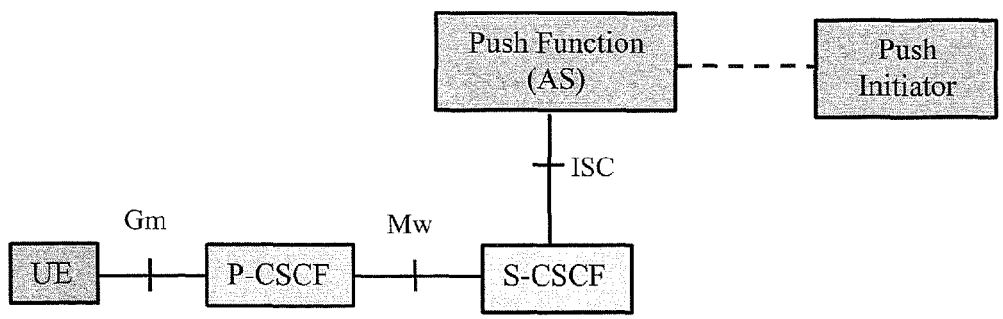
FIG. 21 is a block diagram that illustrates network elements and interfaces for supporting Push over IMS in accordance with some embodiments of the present invention.

FIG. 21 illustrates the network elements and interfaces that are used to support Push over IMS. The Push Function may adopt the role of an Application Server (AS). It is connected via an ISC-interface towards the S-CSCF. Terminating IMS routing mechanisms are used for reaching the Push Recipient (the terminating UE).

Notification Service Functionality in the ASI Architecture

Figure 22:
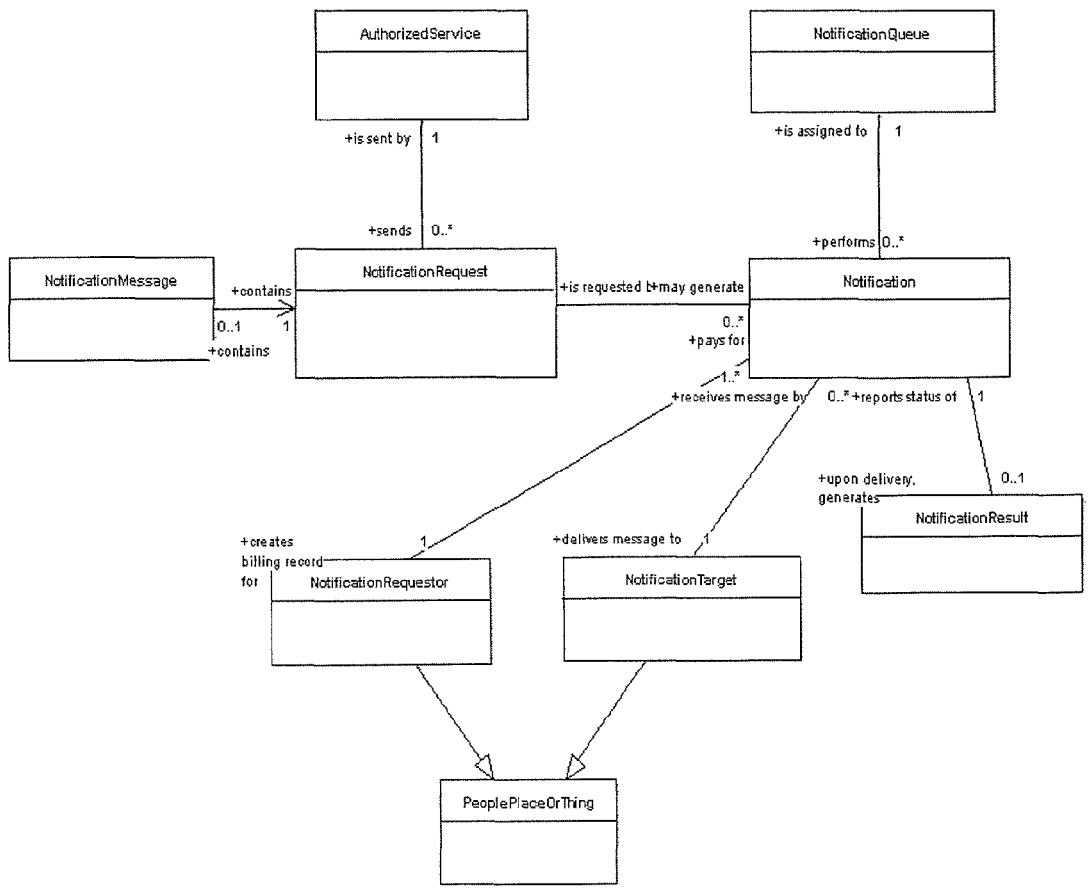
FIG. 22 is a block diagram that illustrates an ASI Notification Service Class model in accordance with some embodiments of the present invention.

The ASI Notification Service can be used to generate a notification by any application service in accordance with some embodiments of the present invention. In addition, end users can use the service indirectly via a client application. The service may include, but is not limited to, the following capabilities:

- Profile-based/Rules-based notification: The ASI Notification Service may implement the subscriber's notification logic, allowing recipients of notifications to control the delivery of notifications, by specifying notification preferences such as: (1) How they are notified; (2) When they are notified; (3) Actions based on where they are; and (4) Actions based on WHO the notification is from.
- Content adaptation: ASI may provide a universal notification delivery mechanism with device adaptation if needed.
- Selectivity of notification (recipients can specify whether to receive notifications or not)
- Support for immediate or scheduled notifications
- Support for Security requirements: (1) Authenticated notifications; (2) Privacy of notifications; and (3) Protection against denial-of-service attacks (e.g., attacks against infrastructure components such as HSS)
- Support for persistence of notifications
- Support for delivery confirmation Many applications can take advantage of the ASI Notification Service. The following is an exemplary list:
- Traffic reports, travel updates
- Medical notifications
- Security notifications (vehicle or domestic security (break-ins, etc.)
- Weather reports
- Product updates and/or recalls
- Location-based services, such as Reverse-911 notification (a location-based immediate broadcast notification to all subscribers at a specific location)
- Internet gaming
- Billing notifications
- Application error reporting The class diagram of FIG. 22 for the ASI Notification Service shows the generalization of sources of notifications ("authorized service") as well as generalization of the recipients or targets of notifications ("People Place or Thing") in accordance with some embodiments of the present invention.

Notification Service: IMS Evolution to ASI Architecture

Under 3GPP specifications, the IMS Push Function only provides a logical model and reference framework for provisioning push services, including a notification service function. The 3GPP documents do not provide a specification for the following notification service feature functionality:

- Support for notification priority, persistence, and reattempts
- Scheduled delivery of notifications
- Support for content redirection (when a Notification Service delivers a URI/URL for the content)
- a Profile-based/preference based delivery of notifications
- Charging/billing for notifications
- HSS notification profile requirements IMS does provide delivery and content adaptation services in support of a notification service. However, a notification service may specify the appropriate transcoding required to modify the notification message based on the notification target's profile, preference, and presence information.

Figure 23:
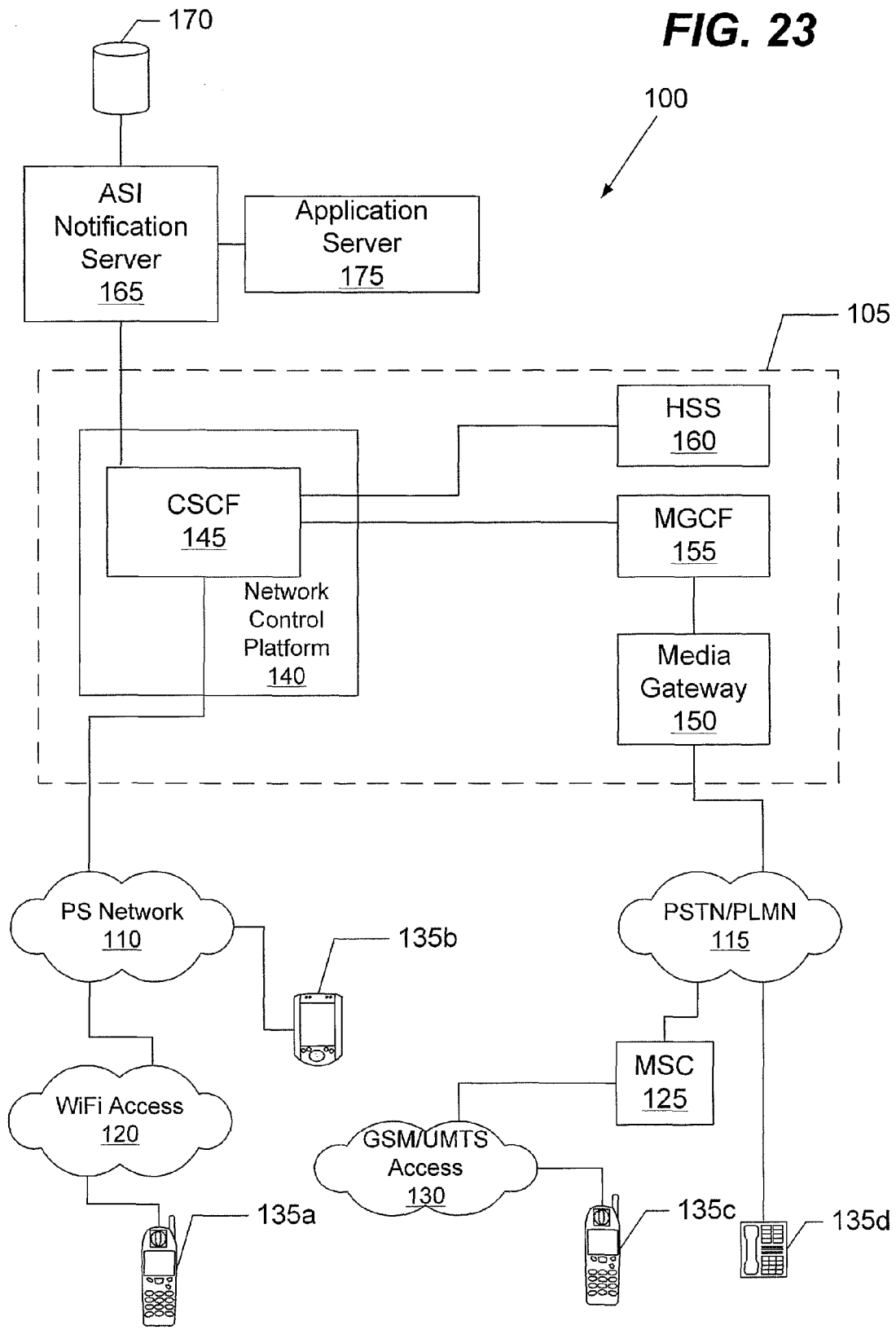
FIG. 23 is a block diagram of a communication network that is configured to provide notification service in accordance with some embodiments of the present invention.

Referring now to FIG. 23 a communication network that may provide an ASI Notification Service, in accordance with some embodiments of the present invention, comprises an Internet Protocol (IP) multimedia subsystem (IMS) network 105 that is coupled to a packet switching network 110 and a Public Switched Telephone Network (PSTN)/Public Land Mobile Network (PLMN) 115. The packet switching network 110 is coupled to a WiFi access network 120. The PSTN/PLMN network 115 is coupled to a Mobile Switching Center (MSC) 125, which supports, for example, a Global System for Mobile Communications (GSM)/Universal Mobile Telecommunications System (UMTS) access network 130. It will be understood that embodiments of the present invention are not limited to GSM and/or UMTS. Other cellular communication protocols can be used, such as, for example, Advanced Mobile Phone Service (AMPS), ANSI-136, General Packet Radio Service (GPRS), enhanced data rates for GSM evolution (EDGE), code division multiple access (CDMA), wideband-CDMA, and/or CDMA2000. As shown in FIG. 23, cellular base stations comprising the access network 130 may be connected to one or more mobile switching centers 125, which, in turn, can be connected to a PSTN/PLMN 115 or other network.

The packet switching network 110 and the PSTN/PLMN may provide either direct or indirect network access to various types of client devices. For example, the packet switching network 110 via the WiFi access network 120 may provide network access to a WiFi client device 135*a*. The packet switching network 110 may also provide network access directly to a client device 135*b*. The PSTN/PLMN 115 may provide network access to a GSM client device 135*c* indirectly through the GSM/IJMTS access network 130 and the mobile switching center 125. The PSTN/PLMN 115 may also provide network access directly to a conventional Plain Old Telephone Service (POTS) phone 135*d*. The client devices 135*a*, 135*b*, and 135*c* may be Internet Protocol client devices in that they may be capable of communicating using SIP. Client device 135*d* may not be capable of setting up communication sessions via SIP. As used herein, the term "Internet Protocol (IP) terminal or device" refers to a terminal or device that may communicate using the session initiation protocol (SIP). It will be understood that an IP terminal or device may also refer to devices that communicate using SIP via a media gateway, which translates communications, for example, between an IP network and another network, such as the public switched telephone network or a circuit switched wireless network.

The packet switching network 110 connects to the IMS network 105 via the network control platform 140. The network control platform 140 comprises a call session control function (CSCF) 145. The CSCF 145 is connected to an ASI Notification server 165 and an Application Server 175 and enables the registration of IP terminals/devices and the routing of SIP signaling messages between the servers 165 and 175 and the client devices 135*a* and 135*b*. The CSCF 145 may provide similar functionality for the client devices 135*c* and 135*d* connected to the network 105 via a media gateway 150 and a media gateway control function (MGCF) 155. The MGCF 155 enables SIP signaling to inter-work with other types of signaling used by the media gateway 150. Thus, the combination of the MGCF 155 and the media gateway 150 may provide an interface between the SIP signaling used in the IMS network 105 and the signaling used in the PSTN/PLMN 115.

The IMS network 105 may further comprise a home subscriber server (HSS) database 160 that maintains a service profile and other information for each end-user and associated IP terminal/device that has registered with the IMS network 105. The profile and other information may include, but is not limited to, IP address information, roaming information, and/or telephony services information. The HSS 160 may further include user or subscriber profiles that specify how the subscriber is to be notified, when the subscriber is to be notified, defaults and/or preferences for notifications based on where the subscriber is located, and/or defaults and/or preferences for notifications based on who the notification is from. Note that the user or subscriber may be an Application Service Provider (ASP) or other abstract entity in accordance with various embodiments of the present invention.

The ASI Notification Server 165 may be configured to cooperate with the CSCF 145 to provide a notification delivery platform for subscribers, ASPs, and/or other abstract entities. In some embodiments, the ASI Notification Server may receive a notification to be delivered to one or more susbscribers, ASPs, and/or other entities, which may be stored in a notification repository 170. The ASI Notification Server 165 may then process rules defined for the delivery of notifications in conjunction with user profiles for each of the recipients that are stored in the HSS 160. The ASI Notification Server 165 delivers the notification to the appropriate recipients based on the rules as applied to the profiles defined for the recipients. The ASI Notification Server 165 may also be configured to cooperate with the HSS 160 to setup and store the user profiles in the HSS 160 for the subscribers, ASPs, and/or other entities. As shown in FIG. 23, an Application Server 175 may be communicatively coupled to the ASI Notification Server 165 to generate and/or receive notifications directly without the need for processing by the CSCF 145 in accordance with some embodiments of the present invention.

Although shown as separate servers in FIG. 23, the ASI Notification Server 165 and the Application Server 175 may be implemented as a single server, separate servers, or a network of servers either co-located in a server farm, for example, or located in different geographic locations. Likewise, the notification repository 170 may be implemented as a single repository, separate repositories, or a network of repositories located in a single location or in different geographic locations.

The various elements of the communication network 100 may be connected by a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network (VPN). Although FIG. 23 illustrates an exemplary communication network, it will be understood that the present invention is not limited to such configurations, but is intended to encompass any configuration capable of carrying out the operations described herein.

Figure 24:
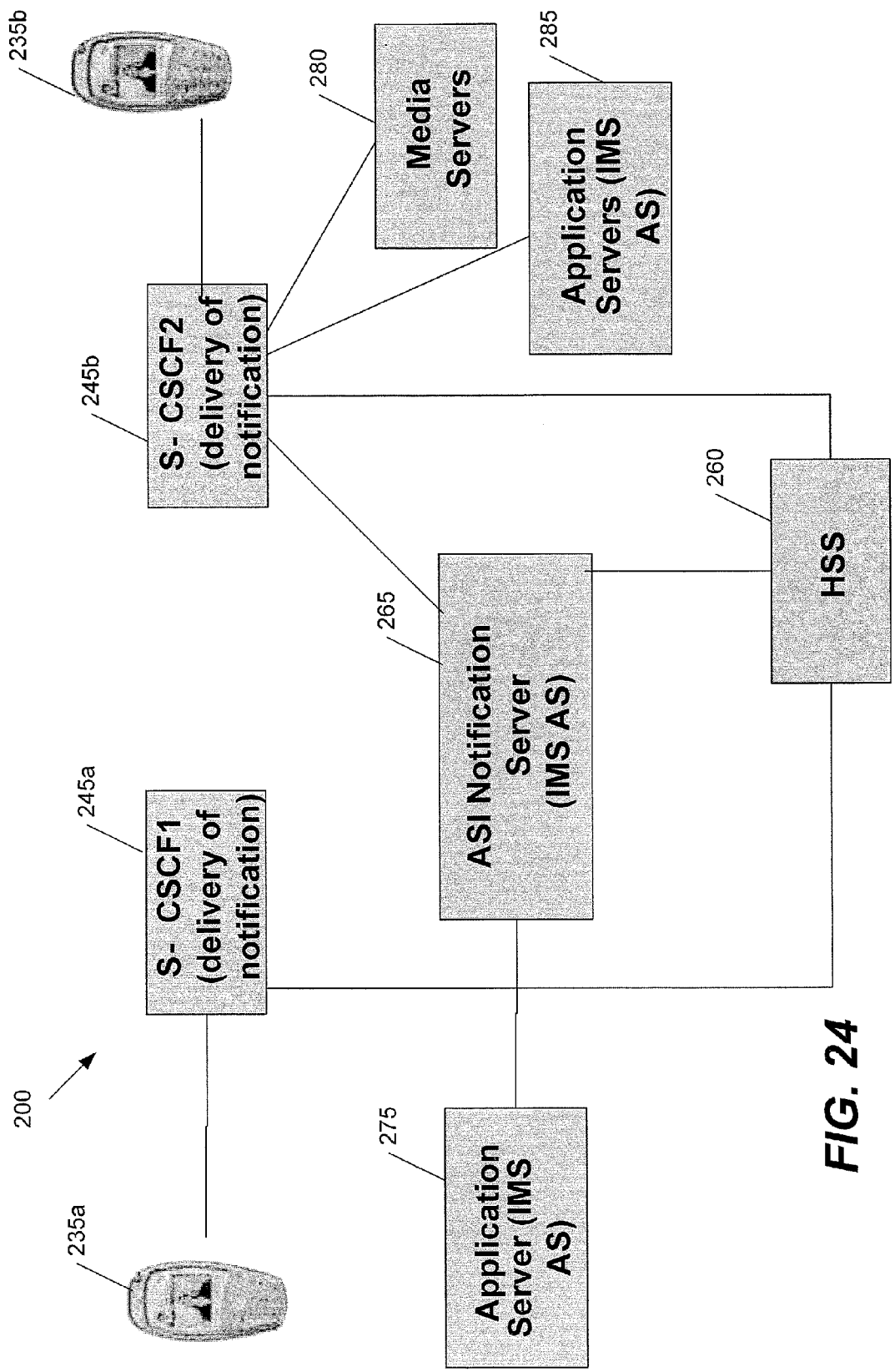
FIG. 24 is a block diagram that illustrates the ASI Notification server and elements of the IMS network of FIG. 23 in accordance with some embodiments of the present invention.

Referring now to FIG. 24, the relationship between the ASI Notification Server and other network elements will be further described. The communication network 200 includes an ASI Notification Server 265 that is communicatively coupled to multiple CSCFs, namely S-CSCF1 245*a* and S-CSCF2 245*b*. As shown in FIG. 24, the ASI Notification Server 265 may use CSCF1 245*a* to communicate with client device 235*a* to receive notifications therefrom and/or to deliver notifications thereto. Similarly, the ASI Notification Server 265 may use CSCF2 245*b* to communicate with client device 235*b* to receive notifications therefrom and/or to deliver notifications thereto. As discussed above, various types of entities may subscribe to the ASI notification service in accordance with various embodiments of the present invention. Thus, the ASI Notification Server 265 may use CSCF2 245*b* to communicate with media server 280 and application servers 285 to receive notifications therefrom and/or to deliver notifications thereto. The HSS 260 may be used to store notification profiles for each of the client devices 235*a* and 235*b* along with the media servers 280 and the application servers 285. The application server 275 is analogous to the application server 175 of FIG. 23.

Figure 25:
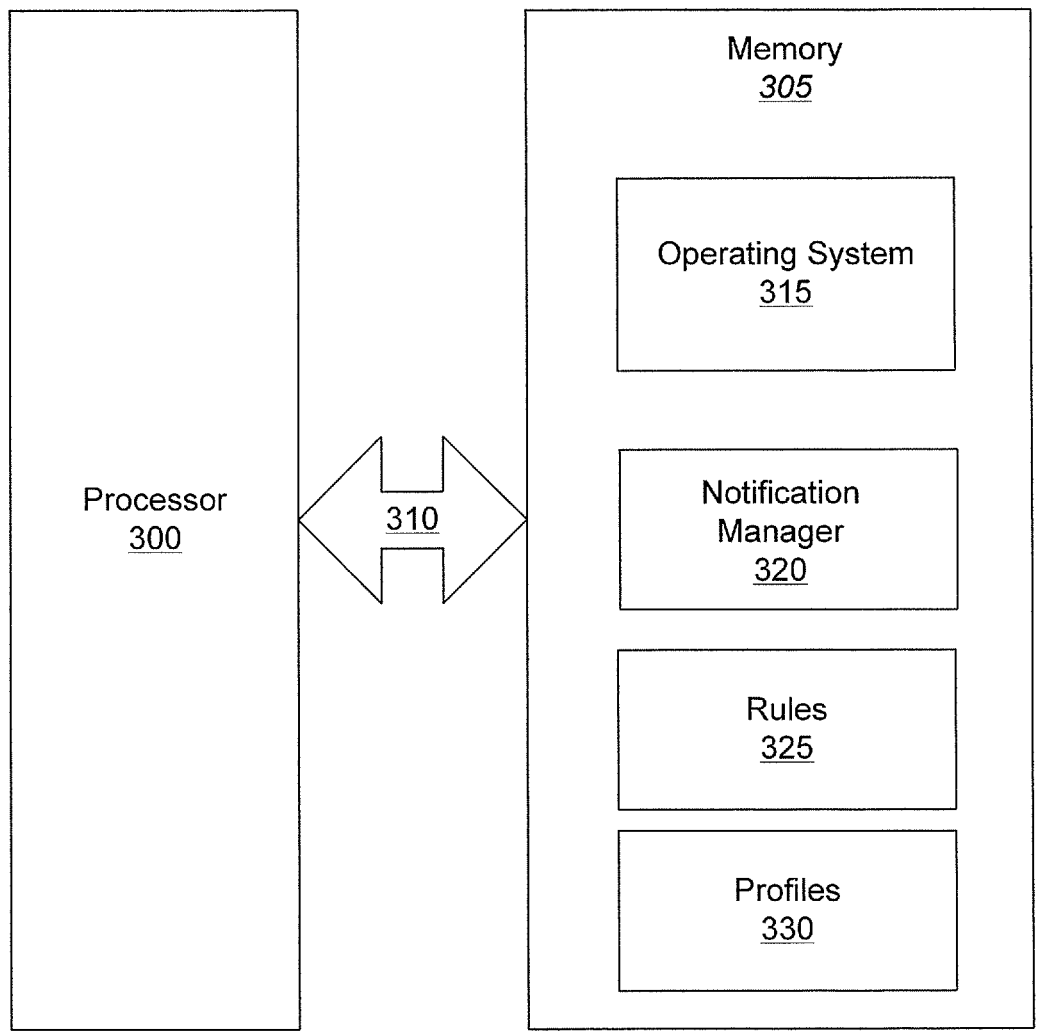
FIG. 25 is a block diagram that illustrates an exemplary software architecture for the ASI Notification server of FIGS. 23 and 24 in accordance with some embodiments of the present invention.

FIG. 25 illustrates a processor 300 and memory 305 that may be used in embodiments of the ASI Notification Server 165 of FIGS. 23 and 265 of FIG. 24 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for processing notifications, in accordance with some embodiments of the present invention. The memory 305 may include, but is not limited to, the following types of devices: cache, ROM, PROM, EPROM, EEPROM, flash, SRAM, and DRAM.

As shown in FIG. 25, the memory 305 may contain four or more categories of software and/or data: an operating system 315, a notification manager 320, a rules module 325, and a profiles module 330. The operating system 315 generally controls the operation of the ASI Notification Server. In particular, the operating system 315 may manage the ASI Notification Server's software and/or hardware resources and may coordinate execution of programs by the processor 300. The Notification manager 320 may be configured to process rules 325 defined for the delivery of notifications in conjunction with user/subscriber profiles 330 for each of the recipients that are stored in the HSS (e.g., HSS 160 of FIG. 23). The rules 325 may be a set of logical constructions that may be applied to the profiles 330, which specify how the subscriber is to be notified, when the subscriber is to be notified, defaults and/or preferences for notifications based on where the subscriber is located, and/or defaults and/or preferences for notifications based on who the notification is from.

The notification manager 320 may also cooperate with the User Profile Service shown, for example, in FIG. 4 and described above along with the HSS to create, store, and manage notification profiles for the individual subscribers, ASPs, and/or other entities.

In other embodiments, the notification manager 320 may be configured to cooperate with the Authentication Service shown, for example, in FIG. 4 to authenticate and/or ensure that notifications are transmitted and maintained in a secure manner so as not to violate the privacy of a subscriber, ASP, and/or other entity. For example, the Authentication Service may be configured to authenticate users and devices as well as authorize them to invoke notification services in a secure manner. A single-sign-on (SSO) sub-component may be configured to enable subscribers, ASPs, and/or other entities to be authenticated by other domains or Web sites without having to maintain multiple user name/password combinations. For example, a user may use a single PIN once to access multiple services without needing additional authentication. A security policy management sub-component may be configured to manage policy/rules regarding user/subscriber and device authentication and authorization. For example, a user password may expire after six weeks.

In still other embodiments, the notification manager 320 may be configured to provide a mechanism to send notifications to subscribers, ASPs, and/or other entities on demand, at a specific future time, and/or on a scheduled basis. Thus, the delivery of notifications may be managed along with the queuing, aging, and/or holding of notifications in accordance with various embodiments of the present invention.

Although FIG. 25 illustrates exemplary hardware/software architectures that may be used in an ASI Notification server, such as the ASI Notification Server 165 of FIG. 23, it will be understood that the present invention is not limited to such a configuration but is intended to encompass any configuration capable of carrying out operations described herein. Moreover, the functionality of the hardware/software architecture of FIG. 25 may be implemented as a single processor system, a multi-processor system, or even a network of stand-alone computer systems, in accordance with various embodiments of the present invention.

Computer program code for carrying out operations of the software modules discussed above with respect to FIG. 25 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 26:
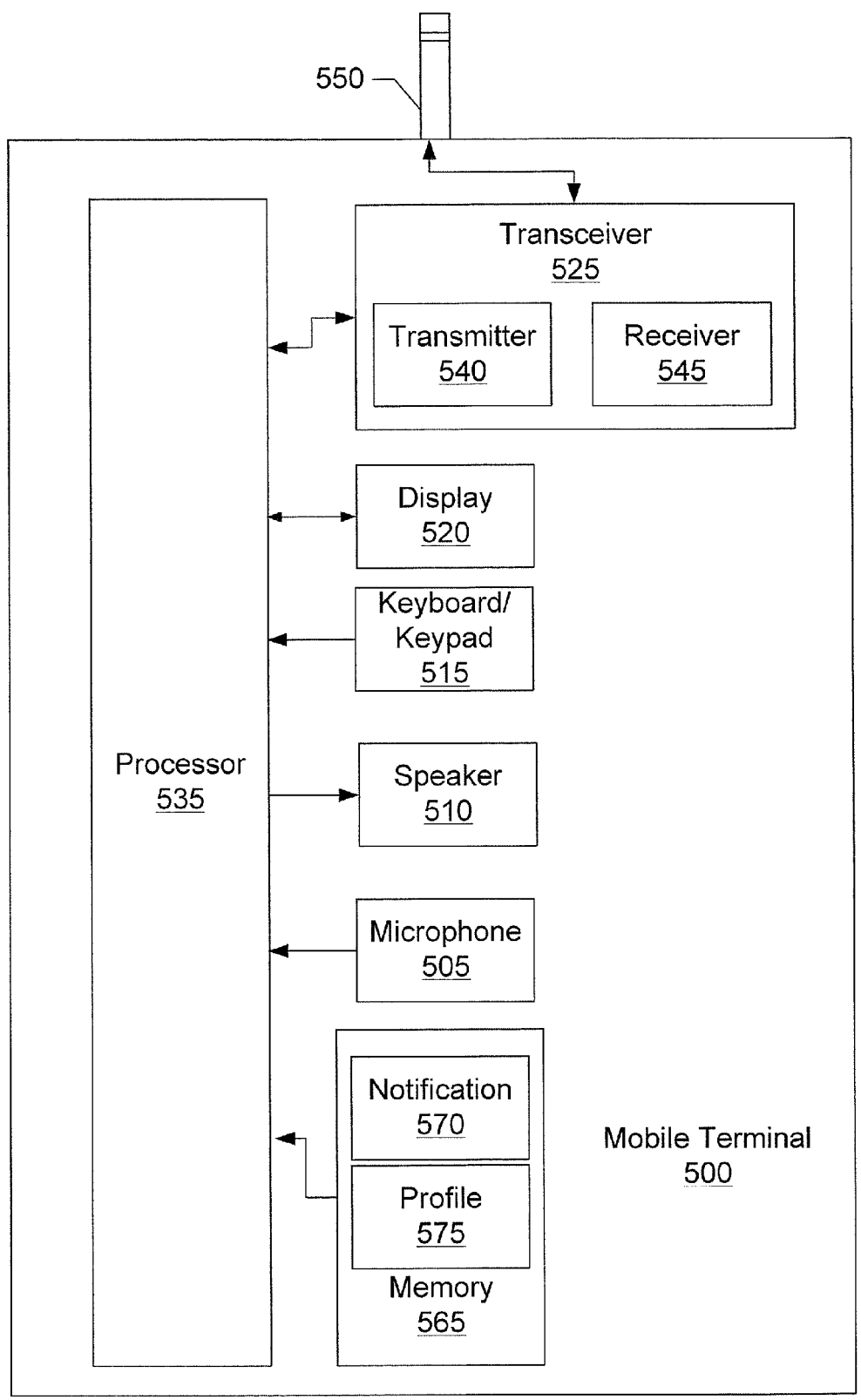
FIG. 26 is a block diagram that illustrates a client terminal of FIG. 23 and FIG. 24 in accordance with some embodiments of the present invention.

Referring now to FIG. 26, an exemplary client device/mobile terminal 500, in accordance with some embodiments of the present invention, may include, but is not limited to, a microphone 505, a speaker 510, a keyboard/keypad 515, a display 520, a transceiver 525, and a memory 565 that communicate with a processor 535. The microphone 505 may represent a single microphone or may represent multiple microphones. The transceiver 525 includes a transmitter circuit 540 and a receiver circuit 545, which respectively transmit outgoing radio frequency signals to, for example, base station transceivers and receive incoming radio frequency signals from, for example, the base station transceivers via an antenna 550. The radio frequency signals transmitted between the client device 500 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the client device 500, without the capabilities of the present invention, may be included in many conventional client devices and their functionality, with respect to such conventional operations, is generally known to those skilled in the art.

As shown in FIG. 25, the client device 500 may include a notification module 570 and a profile module 575 in the memory 565. The notification module 570 may be configured to communicate allow the client device 500 to communicate with the ASI notification server to send notifications thereto and/or to receive notifications therefrom. The profile module 575 may be configured to allow the client device 500 to communicate with the ASI notification server and the HSS to setup a profile for the subscriber and/or device on the HSS. The profile may specify how the subscriber and/or device is to be notified, when the subscriber and/or device is to be notified, defaults and/or preferences for notifications based on where the subscriber and/or device is located, and/or defaults and/or preferences for notifications based on who the notification is from.

Although FIG. 25 illustrates a client device that is configured to transmit and/or receive notifications to/from an ASI Notification Server, it will be understood that other types of devices, systems, and/or other entities may be configured to transmit and/or receive notifications to/from an ASI Notification Server in accordance with various embodiments of the present invention. Moreover, a client device is not limited to a wireless client device or an IP client device. Wireline and non-IP client devices may also be used in accordance with various embodiments of the present invention.

The present invention is described hereinafter with reference to flowchart and/or block diagram illustrations of methods, systems, client devices, and/or computer program products in accordance with some embodiments of the invention. These flowchart and/or block diagrams further illustrate exemplary operations of providing a notification service in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 27:
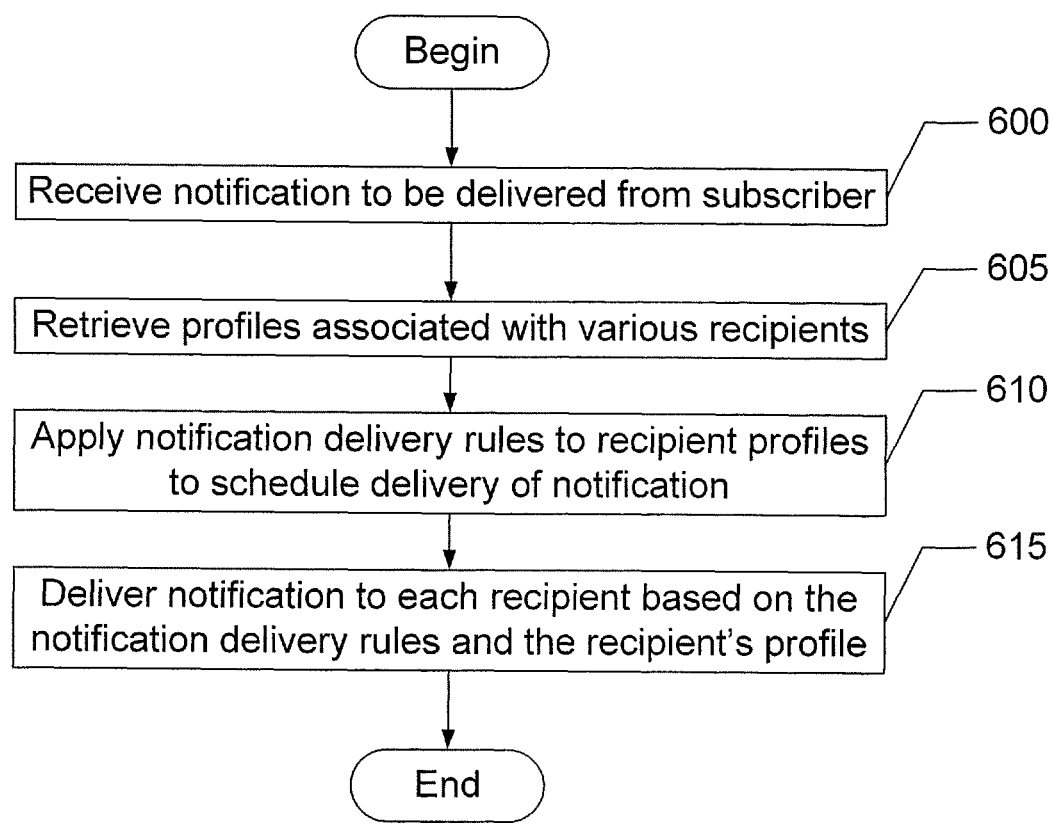
FIG. 27 is a flowchart that illustrates operations for providing a notification service in accordance with some embodiments of the present invention.

Referring now to FIGS. 27 and 23, operations begin at block 600 where the ASI Notification Server 165 receives a notification from a subscriber that is to be delivered to one or more recipients. The notification manager 320 (FIG. 25) retrieves the profiles associated with the recipient(s) from the HSS 160 at block 605. The ASI Notification Server 165 then, at block 610, applies the rules to the profiles associated with the recipients, which specify how each recipient is to be notified, when the recipient is to be notified, defaults and/or preferences for notifications based on where the recipient is located, and/or defaults and/or preferences for notifications based on who the notification is from. In this regard, the notification manager 320 may cooperate with other functions, such as the Presence Service, Location Service, and/or Mobility Management Service to obtain information about where the recipient is located when scheduling delivery of the notification for the recipient. At block 615, the ASI Notification Server 165 delivers the notification to each recipient based on the application of the notification rules to the profiles for the various recipients.

Thus, in accordance with some embodiments of the present invention, a notification service may provide a shared mechanism for applications, devices, systems, or other entities to send notifications to each other either on demand or at a scheduled time. Notifications may be delivered to the recipients based on location and/or other subscriber/device profile information. The notification service may also provide content adaptation for delivery to various types of systems and/or devices. Various types of applications may make use of such a notification service including, but not limited to, traffic reports/travel updates, medical notifications, security notifications (e.g., vehicle or domestic security), weather reports, product updates/recalls, location-based services, such as a reverse-911 notification, Internet gaming, billing notifications, and/or application error reporting.

Location-Based Services

In accordance with some embodiments of the present invention, location based services may be treated as a usage and application enabler rather than as an application. The underlying technologies are described briefly below.

Location based services exploit knowledge of a mobile subscriber's positioning information, profile, and history to provide localized and personalized safety, as well as content-based services. Determining the position of the end user's mobile device may enable delivery of relevant or contextual services. End-user surveys indicate that location based services are among the most compelling non-voice mobile applications for US subscribers. This is especially true among individuals who have 50% or more of their monthly mobile usage dedicated to business purposes—this group lists navigation/mapping and family tracking applications as being two of the most interesting cellular data services. The top location-based services forecast for the next several years are projected to be as follows.

E911
Navigation
Roadside Assistance
Weather
Business Finder
Traffic Information
Travel Information
Mobile Location-based Advertising Location based services generally fall into four categories:
1. Safety—Emergency services and roadside assistance
2. Information—Business finder, traffic alerts, and weather
3. Tracking—Friend finder, fleet management, and child tracker
4. Billing—Zoned-based pricing options Regulatory requirements are forcing carriers to accurately position wireless emergency calls (E-911 in the United States). Mobile operators generally realize that the resulting network infrastructure upgrade costs will need to be recovered. As a result, service providers now view subscriber location information as a tangible asset that can be leveraged to establish partnerships with consumer product and service companies to offer targeted commercial applications. This paves the way for more dynamic business models, such as revenue sharing, co-marketing partnerships, and branded content, and for mass-market adoption of mobile data applications, such as multimedia messaging.

Various technologies, such as Cell-ID, Enhanced Observation Time Difference (E-OTD), Time Difference of Arrival (TDOA), Angle of Arrival (AOA) and Assisted GPS(AGPS) are now enabling detection and delivery of precise subscriber positioning information. The TDOA and AOA are network-based methods for determining location while AGPS is a handset based method. E-OTD is a hybrid method used in GSM networks.

Location based services vary in the degree of accuracy and type of location information. One set of services is call routing services based on location. Location can also be used for finding services based on location (e.g., stores, restaurants, ATMs, and printers). Accuracy of location determination varies from geo-spatial coordinates of longitude, latitude, and altitude to room, street, cell id, sector id, county, state, country, time zone, and the like.

Location Based Services in the IMS Architecture

Figure 28:
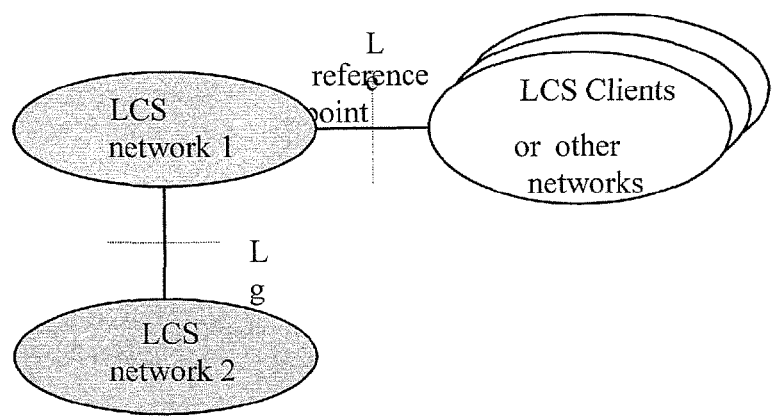
FIG. 28 is a diagram that illustrates LCS access interfaces and reference points in accordance with some embodiments of the present invention.

GPP published stage 1, 2, and 3 specifications for location services (LCS) over a layer 3 mobile radio interface as part of Release 1999. These specifications lay out a functional framework for getting location data for mobile subscribers from LCS Measurement Unit (LMU) to the Serving and Gateway Mobile Location Center (SMLC and GMLC). The specifications have defined the Le interface to LCS Clients as shown in FIG. 28. Release 5 and Release 6 specifications extend this framework for GERAN, still without placing focus on the Le reference point.

Figure 29:
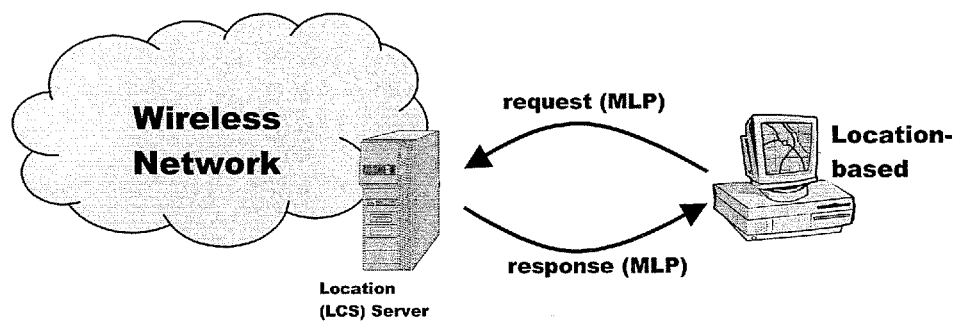
FIG. 29 is as block diagram that illustrates operations of the Mobile Location Protocol in accordance with some embodiments of the present invention.

The Open Mobile Alliance (OMA) has adopted a Mobile Location Protocol (MLP), which is an application-level protocol for getting the position of mobile stations (mobile phones, wireless personal digital assistants, etc.) independently of the underlying network technology. The MLP serves as the interface between a Location Server and a Location Services (LCS) Client, which in 3GPP terms represents the Le reference point. The 3GPP positions the GMLC as the LCS server are shown in FIG. 29.

In MLP, the transport protocol is separated from the XML content. Basic MLP services are based on location services defined by 3GPP, and are defined by the MLP specification. Advanced MLP services are additional services that may be specified in other specifications that conform to the MLP framework. An example of an advanced service is location and contextual awareness in ubiquitous computing applications.

Figure 30:
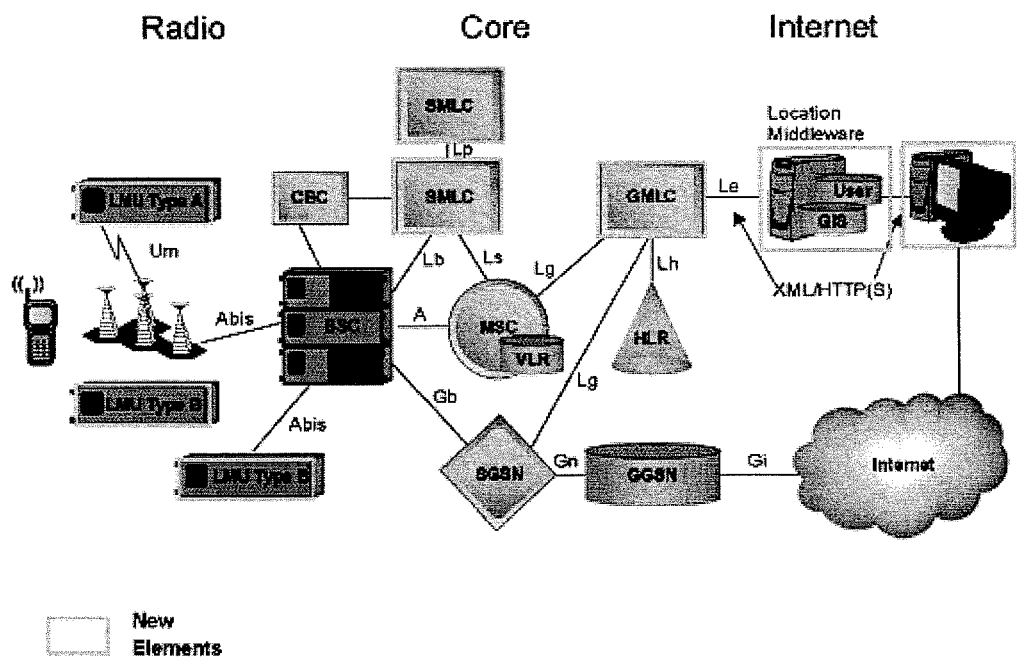
FIG. 30 is a block diagram that illustrates an LCS logical architecture in accordance with some embodiments of the present invention

1. Details on the makeup of the LCS network, in accordance with some embodiments of the present invention, are shown in FIG. 30. Application servers can only get access to location data through the Le interface to the GMLC.

User Entities (UE) may assist in the position calculation. Location Measurement Units (LMU) may be distributed among cells and perform air interface measurements from signals transmitted by base stations (both serving and neighbor). The LMU sends radio interface timing measurement results for performing TDOA analysis to the SMLC via the Base Station Controller (BSC).

Two service initiation models can be used in accordance with various embodiments of the present invention: network initiated (initiated by the SGSN) or client initiated (initiated by an external client node or by the originating UE). Depending on the type of model, a trigger is sent to the SGSN and the SGSN requests the UTRAN (includes the Base Station Controller, Base Transceiver Station, and the LMU) to locate the UE. The UTRAN provides location coordinates after communicating with the UE and subsequently, the SGSN provides the coordinates to the requested nodes/clients.

E-OTD is a hybrid solution that uses the handset and the network to determine a caller's location. It incorporates minor software upgrades for the network, and E-OTD chips are being included in many GSM phones. E-OTD uses a mathematical algorithm to identify the location of the caller based on the time a signal takes to reach a set of base stations and then, through a triangulation scheme, determines the approximate area in which the caller might be. It does this by measuring the time at which signals from the Base Transceiver Station (BTS) arrive at two geographically dispersed locations. These locations can be a number of wireless handsets or a fixed location within the network. The position of the handset is determined by comparing the time differences between the two sets of timing measurements. E-OTD is becoming a de facto standard for E-911 Phase II implementation among U.S. GSM carriers.

Location Based Services in the ASI Architecture

Handsets may encapsulate location data into a SIP header to be used by applications within the IMS architecture in accordance with some embodiments of the present invention. The benefits may include, but are not limited to the following:

For multimedia calls and calls that require location based services, SIP can be used to carry the location coordinates of the UE to the application server;

UE can request a special location based service by inserting a specific SIP header into the message;

SIP message headers can be easily extended to carry location information and to request location based services; and By inserting the location data for multimedia calls when initiating call signaling, additional location services procedures need not be initiated by application servers on receiving the request thus saving time and network bandwidth.

Figure 31:
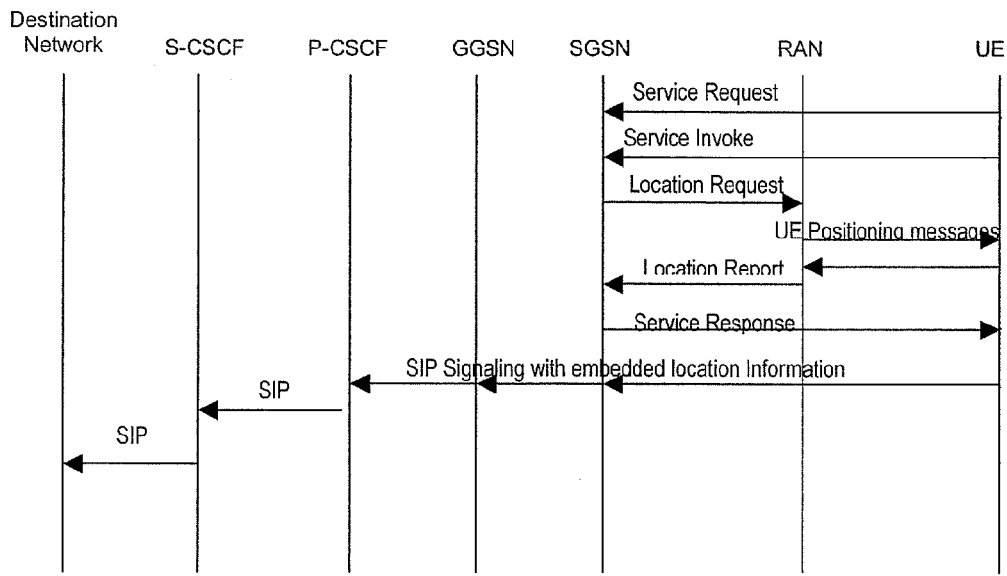
FIG. 31 is a flow diagram that illustrates operations for obtaining location data from a User Entity in accordance with some embodiments of the present invention.

LCS procedures may be initiated by the UE followed by the calculation of geographical coordinates using 3G procedures. The UE device then inserts the location data in subsequent outgoing SIP signaling as shown in FIG. 31.

The UE is responsible for providing the location information to downstream applications. In addition, the network is not required to implement additional procedures or use additional resources to perform UE location determination. The UE device, however, may need to be enhanced to initiate LCS procedures for specific calls. In addition, the UE device may need to be made more intelligent to change call initiation procedures based on the type of call.

In some embodiments, SIP can be extended to support 3G LCS by adding a new parameter to the REQUEST URI that informs the network entities that the call requires location based services ("user=lcs"). A new header that carries location coordinates and wireless cell information may be filled by the UE when it wants to send location information inside SIP messages.

QoS Management

In the underlying IP transport/connectivity network shown in FIGS. 4 and 5, end-to-end QoS mechanisms may be used to ensure that latency-sensitive traffic receives priority over ordinary network traffic. Dynamic services and traffic shaping may ensure predictable and reliable data delivery to both timing sensitive applications (such as VoIP and streaming video) and high-bandwidth, mission-critical applications. QoS management services can deliver differentiated services with guaranteed Service Level Agreements (SLAs) and enhanced services, such as IP telephony and streaming video. SLAs guarantee minimum and maximum throughput using service flow based classification, prioritization, policing, and congestion control. The QoS services can provide insight into every data packet and perform content-aware packet classification. Its QoS and bandwidth-on-demand features may enable bandwidth usage measurements and enforcement of service level agreements, as well as subscriber-driven dynamic bandwidth control. The brokerage service may provide real-time, customer control of QoS, and bandwidth-on-demand allows customers to request, receive, and be billed for additional bandwidth for critical applications during peak periods. The QoS manager may act as a policy manager and enforcement point that provides centralized QoS and service level agreement management, traffic engineering and location services to these IMS networks. To support QoS for real-time services, IMS architectures may provide QoS management at the network core to manage applications resources and control multimedia call states. Additionally, the backbone data network can enable or support QoS features. Edge routers may concentrate ATM streams coming from UTRAN. Core routers may switch IP traffic with MPLS/Diffserv support.

Figure 32:
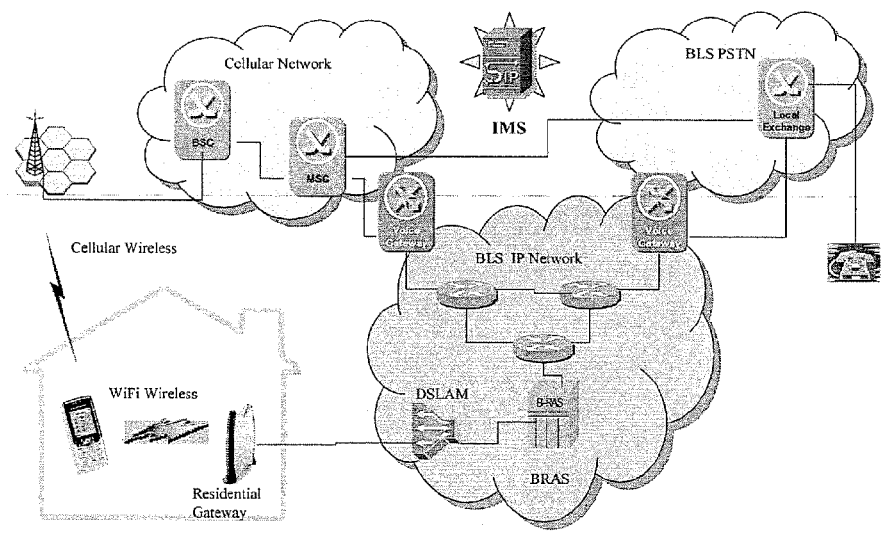
FIG. 32 is a block diagram of an IP network incorporating QoS functionality in accordance with some embodiments of the present invention.

The BRAS and the RG are now responsible for managing the traffic flow through the network as shown in FIG. 32. By enabling these devices to accept policy rules at subscriber session and application levels, IP flows can be managed in a more flexible and "dynamic" manner than previously possible. The BRAS is responsible for managing IP traffic in the downstream direction such that traffic is scheduled according to priority and in a way that ensures that congestion in the downstream network is reduced (i.e., hierarchical scheduling). The RG similarly, manages the scheduling of traffic in the upstream direction based on the priority of the session and/or application. Given that the RG cannot be trusted, the BRAS performs a policing function to ensure the upstream bandwidth in the access network is utilized appropriately. Note that the priority and bandwidth policies can be applied at the PPP session and or application levels; therefore, there is flexibility in how traffic is treated in the network.

The following general assumptions are made about the traffic carried on the underlying transport network:

- All traffic stays inside a controllable administrative domain.
- Diffserv is used as the primary QoS protocol.
- The expedited forwarding code point is used to prioritize real time applications; all other traffic is "best effort."
- Downstream classification is recognized by the BRAS/DSLAM.
- Upstream classification is performed or accepted by the RG and Media Gateways.
- CPE markings and Media Gateway markings are trusted. The contracted maximum ingress rate of priority traffic is policed.
- Hierarchical scheduling is performed at the BRAS to provide IP QoS congestion mechanisms for the downstream path. Similar policing is performed in the upstream path at the RG.

The DSL Forum TR-59 architecture specifies IP-based services and QoS with a single network control plane and the migration of DSL regional transport to leverage newer, alternative technologies. One of the goals of the TR-59 architecture is to provide differentiated services with IP QoS over a non-IP-aware layer 2 network. Because the layer 2 QoS features are not IP aware, they are left unused. Thus, traffic from different IP QoS classes is put into the same queues in the layer 2 nodes. Because the layer 2 nodes generally cannot identify the different IP QoS types within a single queue, congestion may be avoided in all layer 2 network elements to retain IP QoS. Furthermore, IP QoS types that offer jitter management may also avoid congestion in the L2 queues, but also significant queuing delays. When a subscriber purchases a differentiated service, this service flows through the BRAS. To support differentiated services, the BRAS preserves IP QoS downstream through the access node and to the customer premises by means of packet classification, traffic shaping and hierarchical scheduling based on the logical tree-based network topology between the BRAS and the RG.

DSL/IP Network Capacity Planning

Capacity planning is one element for preserving QoS as many networks are designed with an over-subscription ratio. There are more phones than media gateway trunks and so some control plane (SIP) function may provide appropriate blocking when network capacity limits are reached. While this admission control can be simple at first, it may scale to recognize multiple services, multiple network bottlenecks, and potentially multiple paths through the network QoS Policy Walkthrough The QoS policies to support appropriate marking and packet treatment may be installed in the RG and DSLAM, as well as in the Media Gateway and potentially the routers facing the media gateways. The policies are defined during the application development process. The policies may be statically applied during the provisioning process. Policies may become more dynamic as the provisioning models move towards self service/web service models.

Media Gateway

The interfaces from the media gateways to the IP network may be relatively high speed (10 Mb/s or better) so packet transmission latency is less of an issue. The majority of the bearer traffic may initially be voice traffic, with potentially some signaling traffic on the same interfaces. A bandwidth allocation between the signaling and bearer traffic may be required. Appropriate design guidelines for link utilization may be used to ensure that the queuing of the bearer traffic does not occur. "Rules of thumb" for the percentage of link traffic that can be allocated to voice traffic are relatively few. The actual packet bearer traffic may involve laboratory characterization to facilitate better network utilizations.

QoS Challenges

The current network supports Diffserv; however there are some significant QoS limitations in the present architecture. Traffic can be marked EF and given priority, but the scheme can be implemented in several ways. In a strict priority implementation, all other traffic is starved when EF needs all the bandwidth first. Not all devices support strict priority scheduling. There is no current call admission control device in the IP network. This is important because IMS defines a need for an admission control function/bandwidth broker service. Admission control may be used to ensure that there is network capacity available before a call or a session is allowed to be set up. This admission control function may have mechanisms to learn the network capacity.

Trusted CPE is not currently deployed/available, but is desirable. This is a significant limitation because the network must acknowledge Diffserv markings made by the CPE or other devices generating delay-sensitive upstream traffic. Excessive traffic of a particular code point marking will be discarded. If the customer marks the wrong traffic as priority traffic, the network will not be able to make a correction.

The IP traffic may retain its QoS characteristics when it crosses into the CPN and 802.x wireless domain. The current 3GPP specifications dealing with IMS traffic over WLAN do not assume charging correlation and QoS support. WLAN support of layer 2 QoS is being addressed by the IEEE 802.11e study group.

The diagrams of FIGS. 1-32 illustrate the architecture, functionality, and operations of some embodiments of methods, systems, and computer program products according to various embodiments of the present invention. In this regard, each block represents a module, segment, or portion of code, which comprises one or more executable instructions for implementing the specified logical function(s). It should also be noted that in other implementations, the function(s) noted in the blocks may occur out of the order shown in the figures. For example, two blocks shown in succession may, in fact, be executed substantially concurrently or the blocks may sometimes be executed in the reverse order, depending on the functionality involved. It will also be understood that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Many variations and modifications can be made to the preferred embodiments without substantially departing from the principles of the present invention. All such variations and modifications are intended to be included herein within the scope of the present invention, as set forth in the following claims.

That which is claimed:

1. A system for supporting a notification capability for a plurality of applications utilizing a next generation network having a network layer, comprising:
    a notification system comprising a processor; and
    application services middleware between the plurality of applications and the network layer comprising a plurality of common infrastructure elements usable by the applications, wherein a first one of the plurality of common infrastructure elements is to provide a first service that is associated with use of the next generation network and a second one of the plurality of common infrastructure elements is to provide a second service that is not associated with use of the next generation network, and wherein the plurality of common infrastructure elements comprises:
a notification service to facilitate the sending of messages via the notification system from authorized services to recipients based on profile and preference data for the recipients that specify what times to send the messages to the recipients;
wherein the times to send the messages to the recipients comprise on demand, at a specific future time, and on a periodic schedule;
wherein the notification system comprises a network element of an Internet Protocol Multimedia Subsystem; and
wherein the Internet Protocol Multimedia Subsystem comprises a Multimedia Resource Function that is to perform content adaptation for one of the messages.

2. The system of Claim 1, wherein the notification system comprises: a notification server to receive the messages from the authorized services for delivery to the recipients and to send the messages to the recipients;
an Internet Protocol Multimedia Subsystem Serving Call Session Control Function to maintain session state information between the notification server and the authorized services and between the notification server and the recipients; and
a Home Subscriber Server to store recipient profile and preference data.

3. The system of claim 2, wherein the notification server is to retrieve the profile and preference data for the recipients, and wherein the notification server is to apply rules to the profile and preference data to determine how to send the messages to the recipients and to determine when to send the messages to the recipients.

4. The system of claim 3, wherein the plurality of common infrastructure elements further comprises a mobility management service, a presence service, and a location service; and
wherein the notification server is further to send a message to one of the recipients based on one of a location of the at least one of recipients and an identity of the authorized service that is the source of the message to the one of the recipients.

5. The system of claim 2, wherein the plurality of common infrastructure elements further comprises an authentication service that is to ensure that communication between the notification server and the authorized services and between the notification server and the recipients is secure.

6. The system of claim 2, wherein the notification server is further to send a confirmation to one of the authorized services when one of the messages for which the one of the authorized services is the source is delivered.

7. The system of claim 1, wherein the authorized services comprise one of a subscriber device registered with the Internet Protocol Multimedia Subsystem and one of the plurality of applications.

8. The system of claim 1, wherein the notification service is a 3GPP network push service element.

9. A method of providing a notification service, comprising:
providing an application services middleware between a plurality of applications and a network layer of a next generation network, the application services middleware comprising a plurality of common infrastructure elements usable by the different applications, wherein a first one of the plurality of common infrastructure elements is to provide a first service that is associated with use of the next generation network and a second one of the plurality of common infrastructure elements is to provide a second service that is not associated with use of the next generation network;
incorporating a notification service into the application services middleware as a common infrastructure element; and
facilitating the sending of messages from authorized services to recipients using the notification service based on profile and preference data for the recipients that specify what times to send the messages to the recipients;
wherein the times to send the messages to the recipients comprise on demand, at a specific future time, and on a periodic schedule;
wherein the notification service comprises a network element of an Internet Protocol Multimedia Subsystem; and
wherein the Internet Protocol Multimedia Subsystem comprises a Multimedia Resource Function, the method further comprising:
performing content adaptation for one of the messages using the Multimedia Resource Function.

10. The method of Claim 9, further comprising: receiving at the notification service a message from one of the authorized services for delivery to one of the recipients;
retrieving the profile and preference data from a Home Subscriber Server for the one of the recipients;
applying rules to the profile and preference data at the notification service to determine one of how to send the message from one of the authorized services to the one of the recipients and to determine when to send the message from one of the authorized services to the one of the recipients; and
sending the message from one of the authorized services to the one of the recipients.

11. The method of claim 10, wherein sending the message comprises:
sending the message from one of the authorized services to the one of the recipients based on a location of the one of the recipients and/or based on an identity of the one of the authorized services.

12. The method of claim 10, further comprising:
sending a confirmation to the one of the authorized services when the message to the one of the recipients is delivered.

13. The method of claim 9, wherein the authorized services comprise one of a subscriber device registered with the Internet Protocol Multimedia Subsystem and one of the plurality of applications.

* * * * *

UNITED STATES PATENT AND TRADEMARK OFFICE
CERTIFICATE OF CORRECTION

PATENT NO. : 9,288,276 B2
APPLICATION NO. : 11/931949
DATED : March 15, 2016
INVENTOR(S) : Adamczyk et al.

Page 1 of 1

It is certified that error appears in the above-identified patent and that said Letters Patent is hereby corrected as shown below:

In the Claims:
Column 50, Claim 11, Line 50: Please correct "recipients and/or based"
to read -- recipients and based --

Signed and Sealed this
Second Day of August, 2016

Michelle K. Lee
*Director of the United States Patent and Trademark Office*